US011059242B2

(12) United States Patent
McAllister et al.

(10) Patent No.: US 11,059,242 B2
(45) Date of Patent: Jul. 13, 2021

(54) APPARATUS AND METHOD FOR OPERATING A VACUUM BAGGING MACHINE TO FORM A PLEAT OF A VACUUM BAG

(71) Applicant: The Boeing Company, Chicago, IL (US)

(72) Inventors: Steven J. McAllister, Puyallup, WA (US); Lisa C Carlson, Auburn, WA (US); Garrett C. Hanson, Everett, WA (US); Kanna M. Pham, Renton, WA (US)

(73) Assignee: The Boeing Company, Chicago, IL (US)

( * ) Notice: Subject to any disclaimer, the term of this patent is extended or adjusted under 35 U.S.C. 154(b) by 428 days.

(21) Appl. No.: 15/941,430

(22) Filed: Mar. 30, 2018

(65) Prior Publication Data

US 2019/0299544 A1 Oct. 3, 2019

(51) Int. Cl.
*B29C 70/44* (2006.01)
*B64F 5/10* (2017.01)
*B29L 31/30* (2006.01)
*B29C 43/36* (2006.01)

(52) U.S. Cl.
CPC ............... *B29C 70/44* (2013.01); *B64F 5/10* (2017.01); *B29C 2043/3644* (2013.01); *B29L 2031/3076* (2013.01)

(58) Field of Classification Search
CPC ....... B29C 70/44; B29C 70/54; B29C 70/388; B29C 70/386; B29C 70/38; B29C 70/504; B29C 2043/3644; B29C 43/3642; B29C 43/3697; B29C 53/265; B64F 5/10; B64C 3/182; B64C 2001/0072; B29L 2031/3076; B29L 2031/001; B29L 2031/003; B29D 99/0007; B29D 99/0003; B29D 99/001
See application file for complete search history.

(56) References Cited

U.S. PATENT DOCUMENTS 7,866,642 B2 1/2011 McAllister
2005/0056362 A1* 3/2005 Benson ................ B29C 70/388
156/163

* cited by examiner

*Primary Examiner* — Xiao S Zhao
*Assistant Examiner* — Ninh V Le
(74) *Attorney, Agent, or Firm* — Walters & Wasylyna LLC

(57) ABSTRACT

An apparatus is provided for forming a pleat of a vacuum bag into position over a stringer of an uncured skin panel. The apparatus comprises a leading shoe and a trailing shoe that cooperates with the leading shoe to form the pleat of the vacuum bag. The apparatus also comprises at least one roller assembly for compacting the formed pleat into position over the stringer.

21 Claims, 27 Drawing Sheets

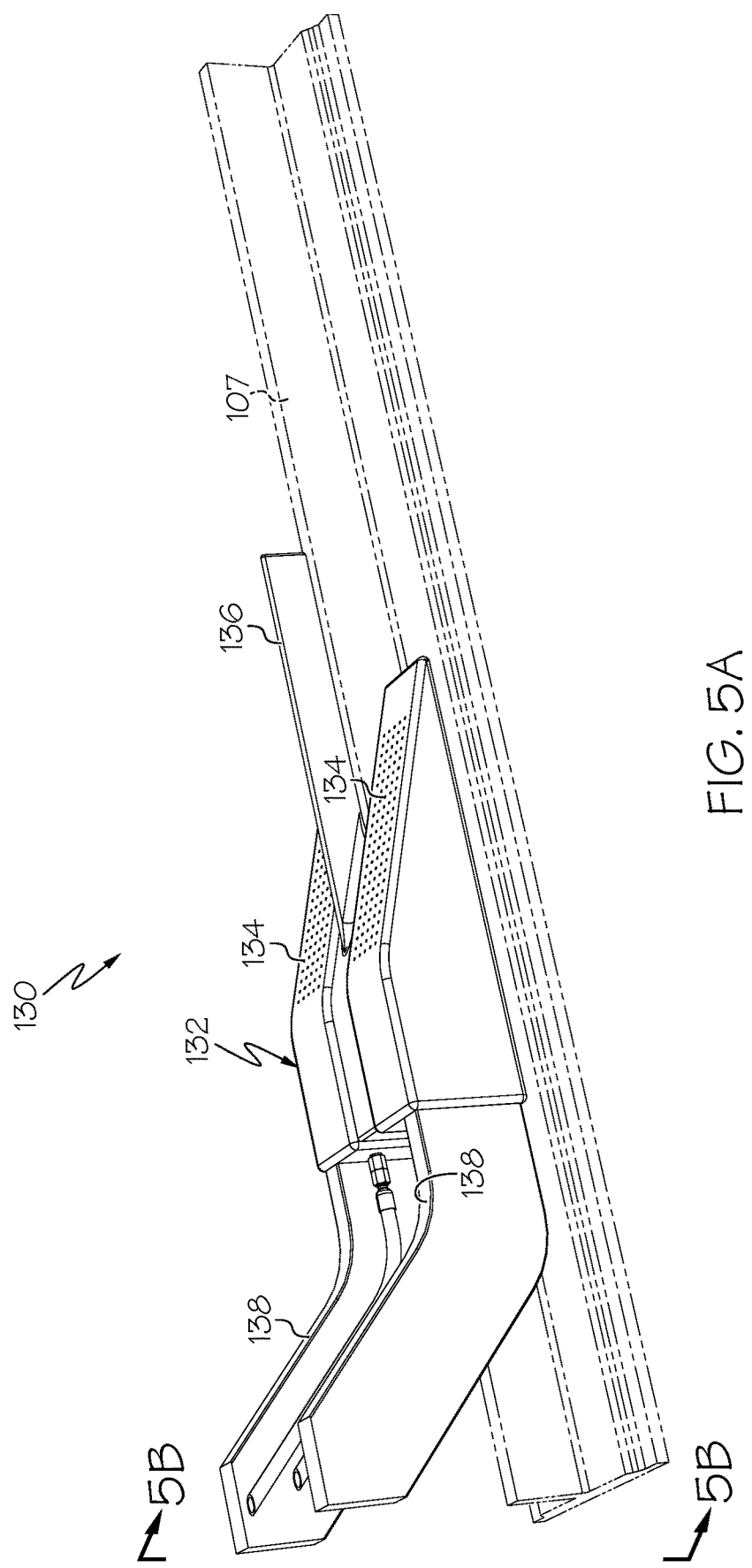

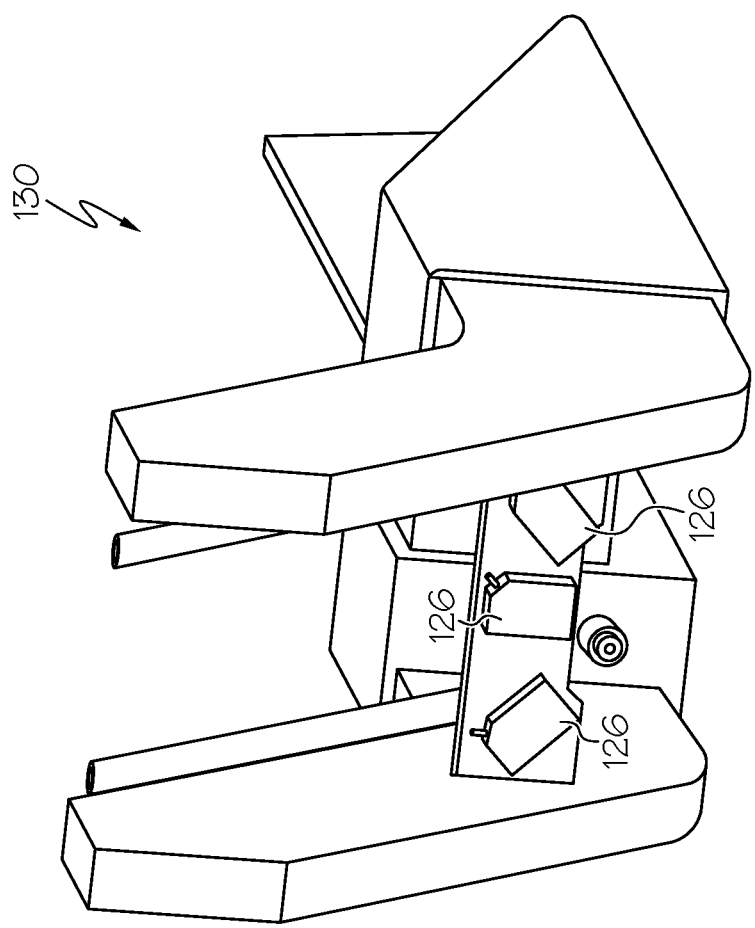

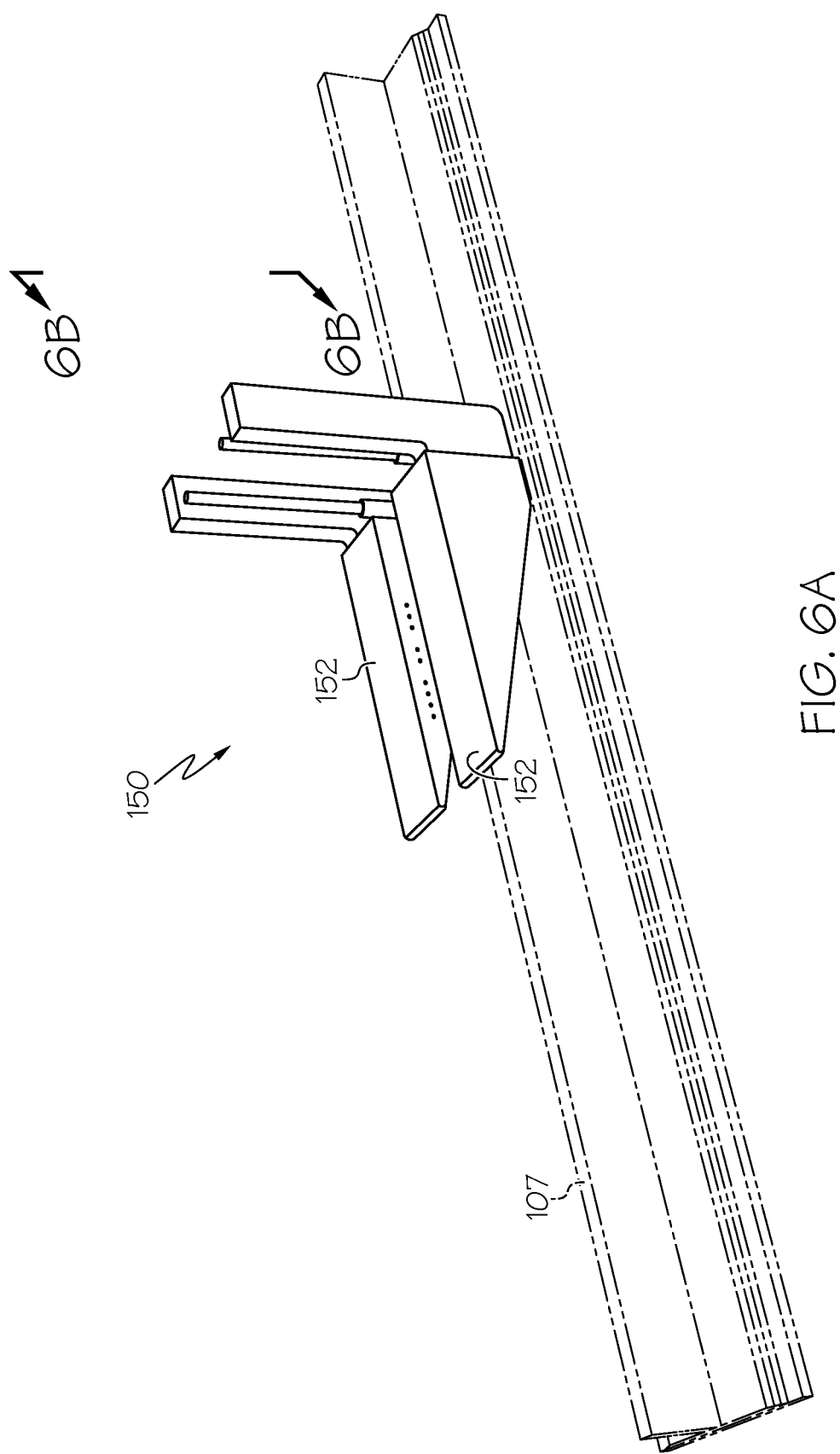

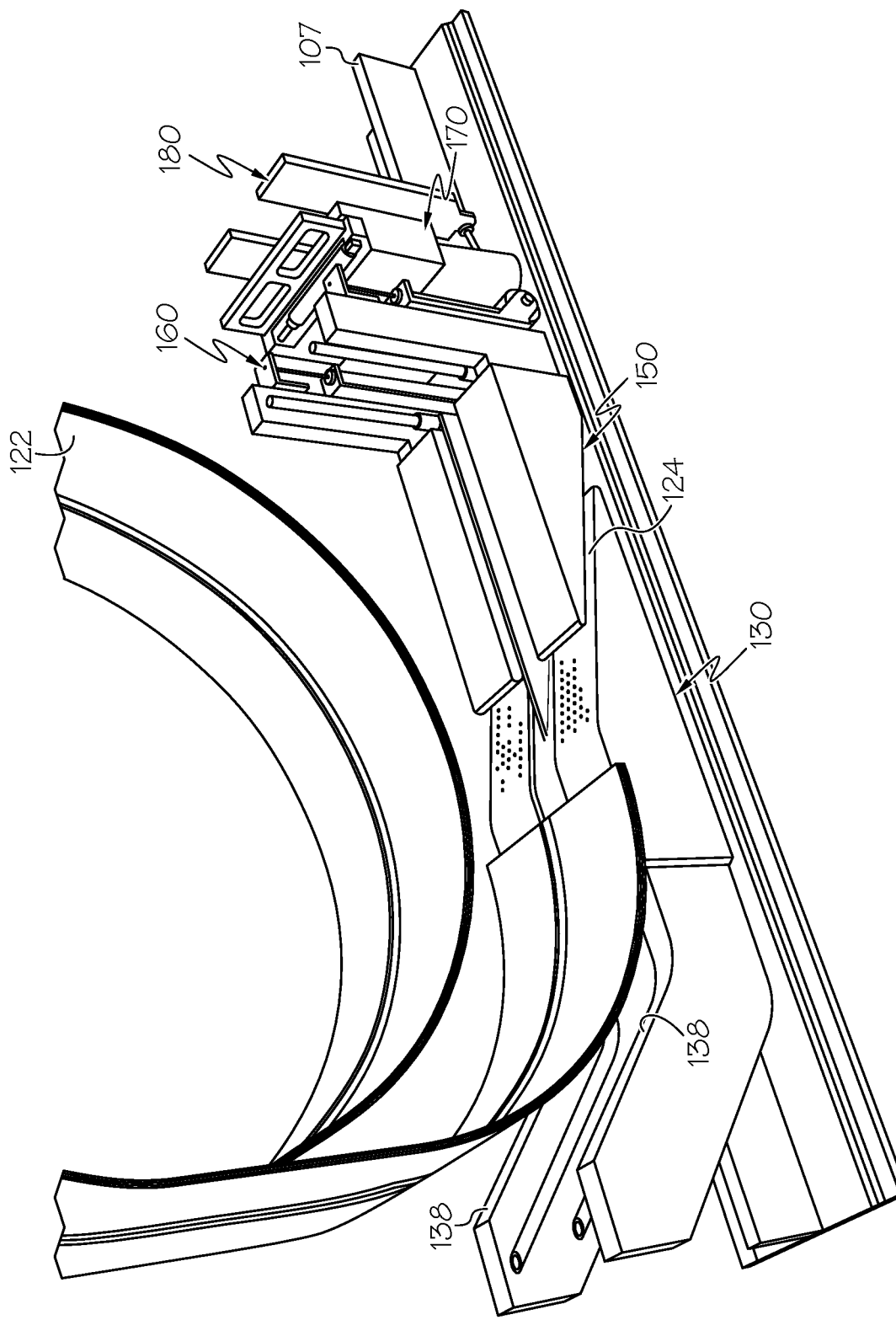

APPARATUS AND METHOD FOR OPERATING A VACUUM BAGGING MACHINE TO FORM A PLEAT OF A VACUUM BAG

FIELD

The present application relates to vacuum bagging machines and, in particular, to apparatus and methods for automatically operating a vacuum bagging machine to form a pleat of a vacuum bag into position over a stringer of an uncured skin panel.

BACKGROUND

A known vacuum bagging machine for bagging an uncured skin panel with stringers uses a gantry to rollout a pre-pleated vacuum bag onto the skin panel with stringers. The skin panel with stringers is lying on a layup mandrel when the pre-pleated vacuum bag is rolled out. One or more operating personnel get up onto the layup mandrel to form pleats of the pre-pleated vacuum bag into position over the stringers. Each pleat is formed into position over a corresponding stringer along the entire length of the skin panel. The forming of the pleats into position over the stringers along the entire length of the skin panel is both laborious and time-consuming and, therefore, costly. Accordingly, those skilled in the art continue with research and development efforts in the field of vacuum bagging machines for bagging an uncured skin panel with stringers.

SUMMARY

In one aspect, an apparatus is provided for forming a pleat of a vacuum bag into position over a stringer of an uncured skin panel. The apparatus comprises a leading shoe and a trailing shoe that cooperates with the leading shoe to form the pleat of the vacuum bag. The apparatus also comprises at least one roller assembly for compacting the formed pleat into position over the stringer.

In another aspect, a method is provided for automatically operating a vacuum bagging machine to form a pleat of a vacuum bag into position over an uncured skin panel including a stringer. The method comprises forming a pleat of the vacuum bag. The method also comprise roller compacting the vacuum bag including the formed pleat over the uncured skin panel including the stringer.

In yet another aspect, a method is provided for automatically operating a vacuum bagging machine to form a pleat of vacuum bag into position over an uncured skin panel including a stringer. The method comprises roller compacting a first portion of the vacuum bag in a first direction against a surface of the uncured skin panel. The method also comprises roller compacting a second portion of the vacuum bag in a second direction against a surface of the stringer, wherein the second direction extends transverse to the first direction.

Other aspects will become apparent from the following detailed description, the accompanying drawings and the appended claims.

BRIEF DESCRIPTION OF THE DRAWINGS

FIG. 5A is a perspective view same as FIG. 4B of only a leading shoe of the apparatus shown in FIG. 4B.

FIG. 5D is an enlarged perspective view, looking approximately in the direction of arrow "5D" of FIG. 5B, and showing a sensor arrangement associated with the leading shoe.

FIG. 6A is a perspective view same as FIG. 4B of only a trailing shoe of the apparatus shown in FIG. 4B.

FIGS. 8A-8E are each a perspective view showing a vacuum bag in a different position.

DETAILED DESCRIPTION

The present application is directed to an apparatus and method for operating a vacuum bagging machine to form a pleat of a pre-pleated vacuum bag into position over a stringer of an uncured skin panel. The specific construction of the apparatus and the industry in which the apparatus and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a vacuum bagging machine and method for bagging an uncured composite skin panel for an airplane. The vacuum bagging machine and method may be implemented by an original equipment manufacturer (OEM) in compliance with military and space regulations.

Figure 1:
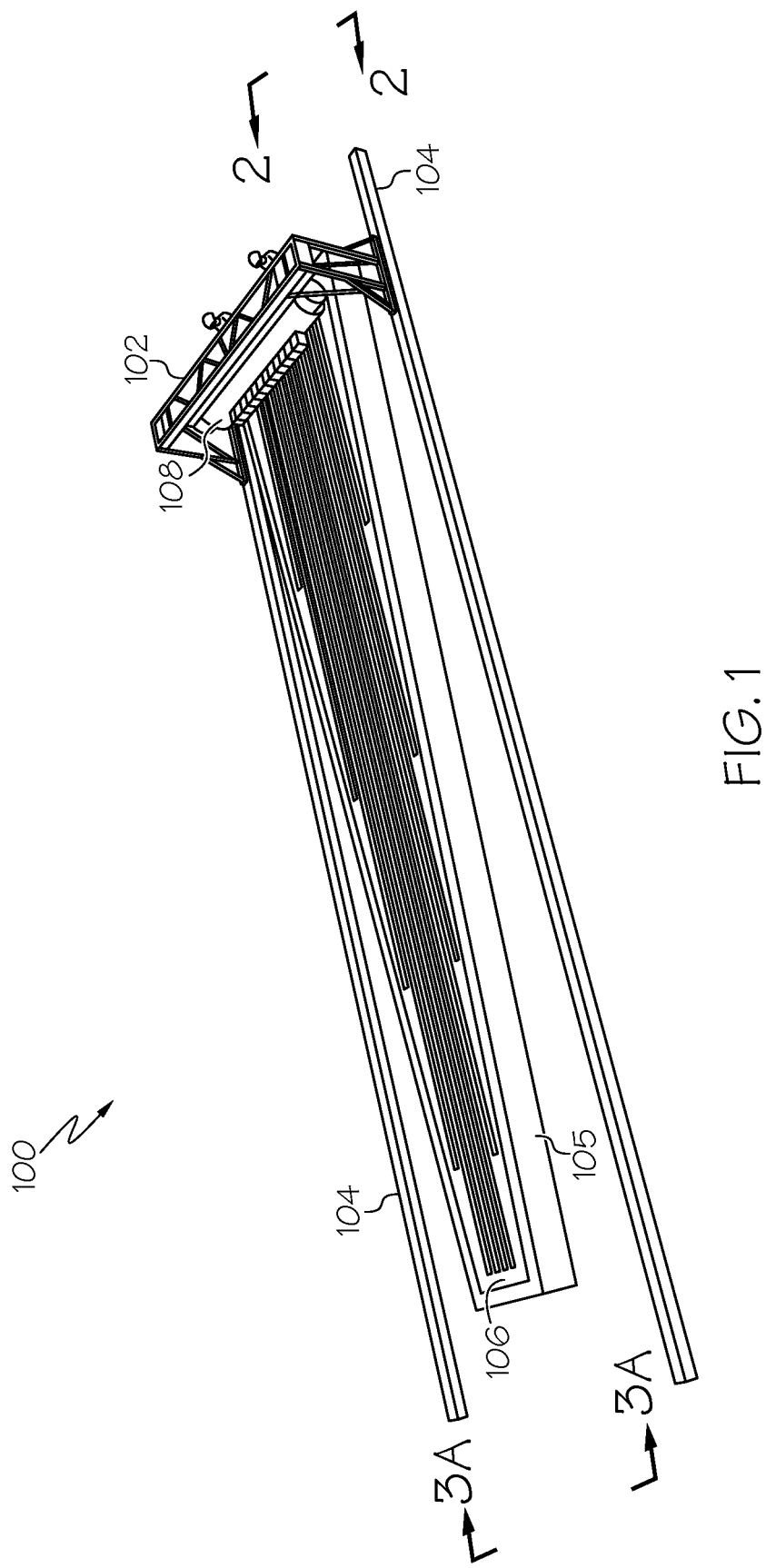
FIG. 1 is a perspective view of an example vacuum bagging machine constructed in accordance with an embodiment, and showing the vacuum bagging machine in a starting position.
Figure 2:
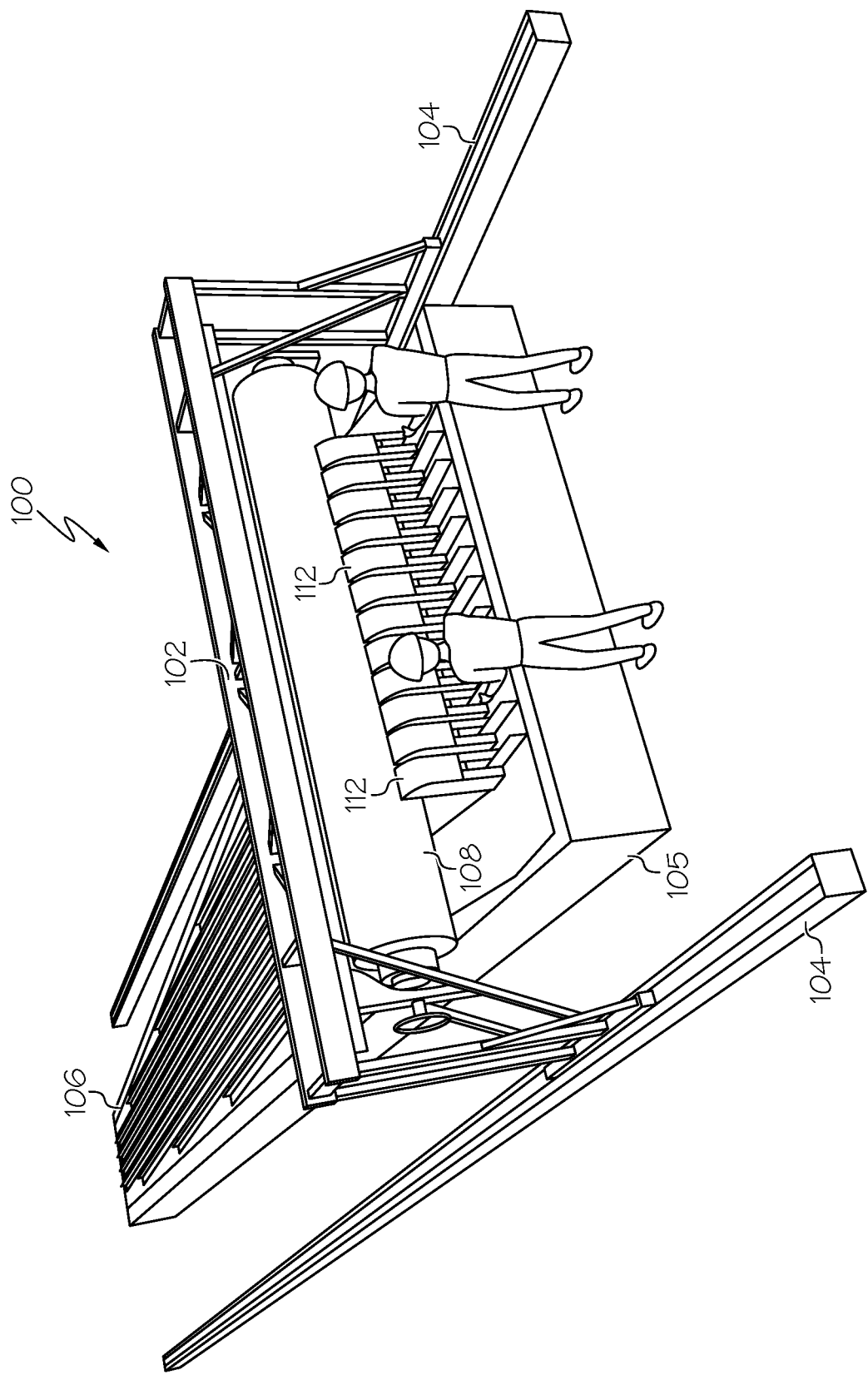
FIG. 2 is a perspective view, looking approximately in the direction of arrow "2" in FIG. 1, of the vacuum bagging machine.
Figure 3A:
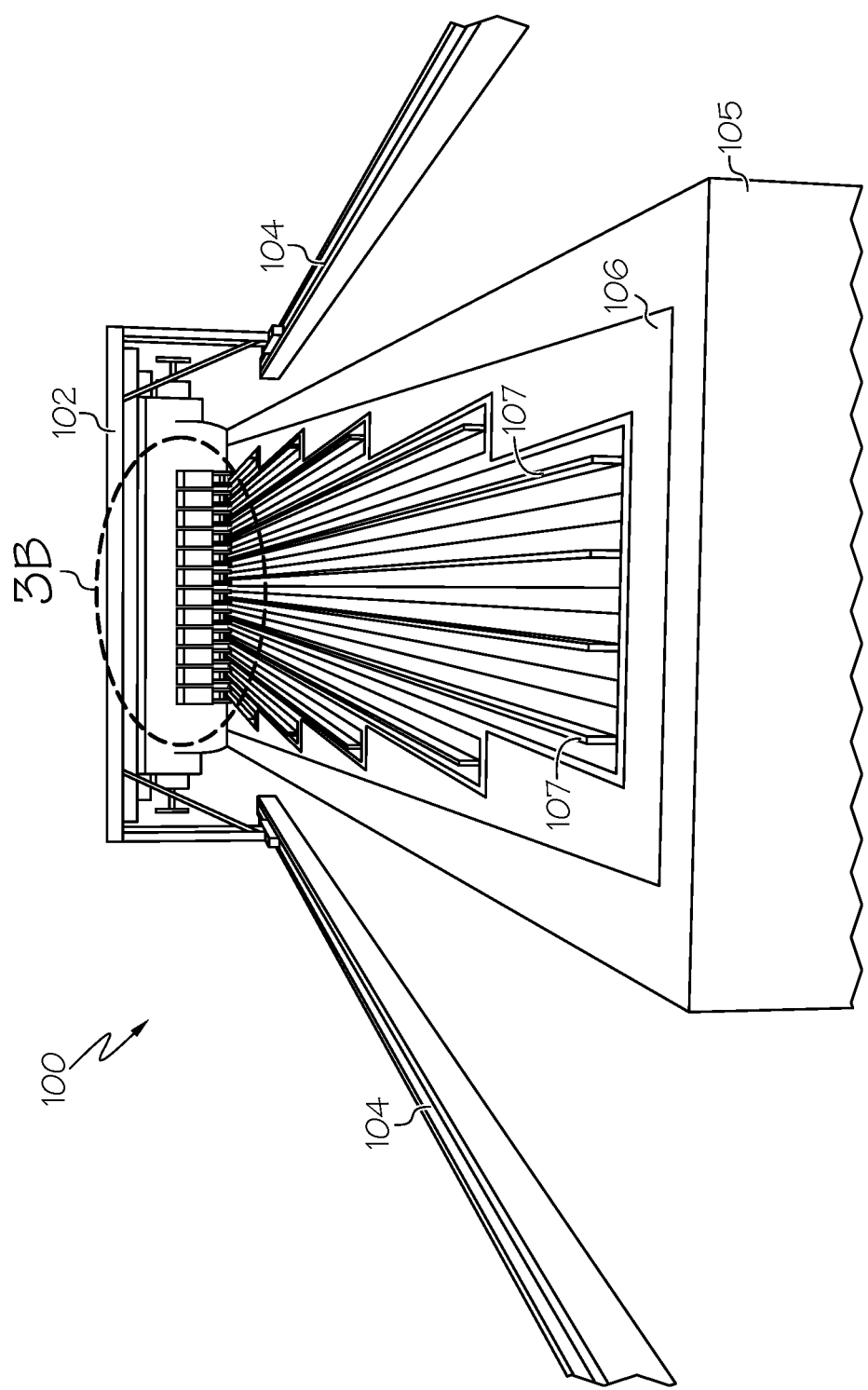
FIG. 3A is a perspective view, looking approximately in the direction of arrow "3A" in FIG. 1, of the vacuum bagging machine.
Figure 3B:
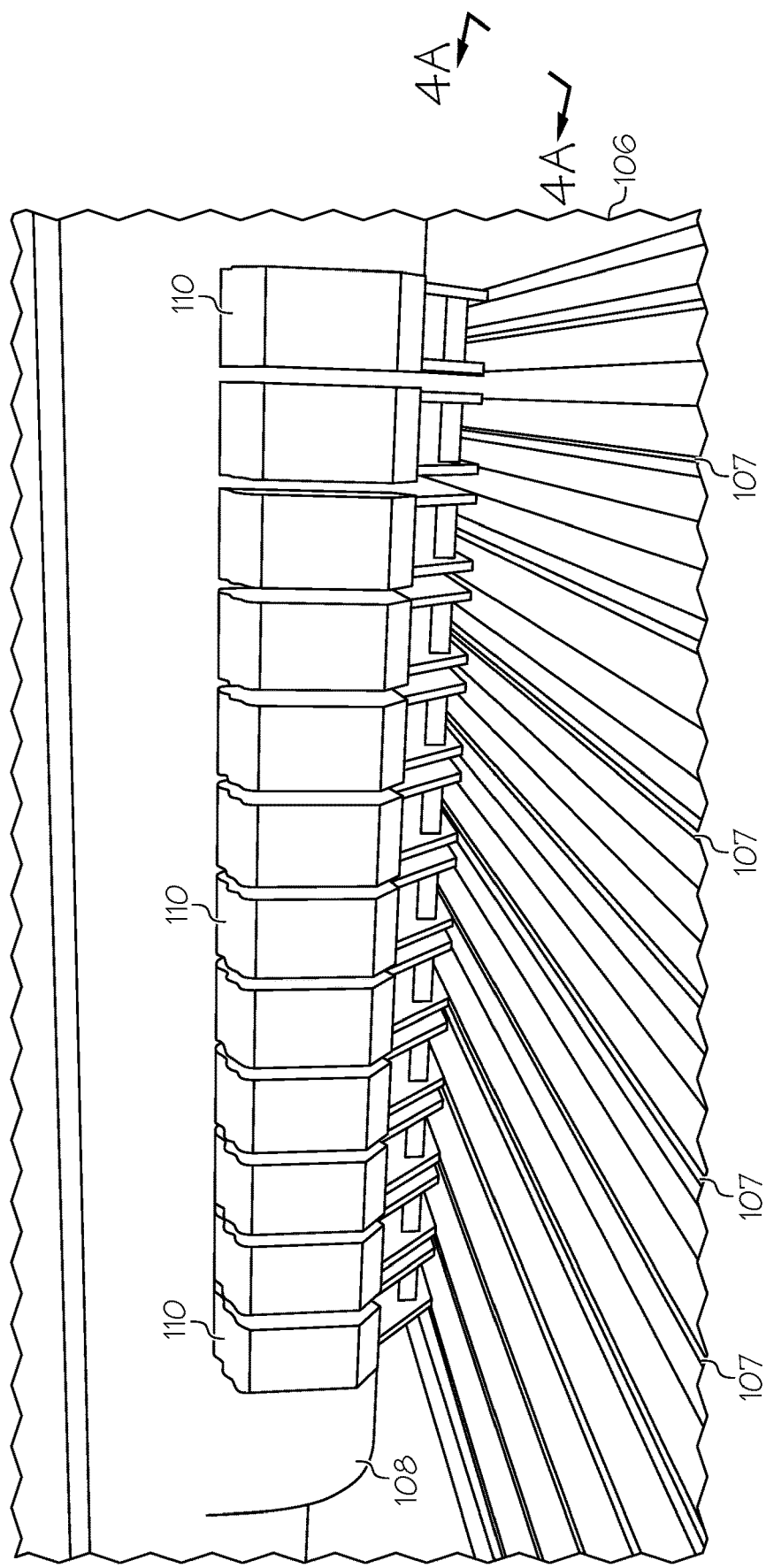
FIG. 3B is an enlarged view of a portion of FIG. 3A, which is designated with oval "3B" in FIG. 3A.

Referring to FIG. 1, a perspective view of an example vacuum bagging machine 100 constructed in accordance with an embodiment is illustrated. FIG. 2 is a perspective view, looking approximately in the direction of arrow "2" in FIG. 1, of the vacuum bagging machine 100. FIG. 3A is a perspective view, looking approximately in the direction of arrow "3A" in FIG. 1, of the vacuum bagging machine 100. FIG. 3B is an enlarged view of a portion of FIG. 3A, which is designated with oval "3B" in FIG. 3A.

The vacuum bagging machine 100 includes a gantry 102 that is slidable along a pair of slide rails 104 over an uncured composite skin panel 106 (or other part) that is lying on a layup mandrel 105. The gantry 102 contains a roll of pre-pleated vacuum bag 108 that is rolled out to bag the skin panel 106 as the gantry 102 slides along the pair of slide rails 104 from right to left as viewed looking at FIG. 1. The gantry 102 also includes a plurality of N/C controlled columns 110, 112. As best shown in FIG. 3B, which is the leading edge of the gantry 102, there are twelve N/C controlled columns 110 shown. Also, as shown in FIG. 2, which is the trailing edge of the gantry 102, there are twelve N/C controlled columns 112 shown. The gantry 102 may include any commercially-available 5-axis N/C machine, for example. Structure and operation of N/C machines and N/C controlled columns of a gantry that is slidable along slide rails are known and conventional and, therefore, will not be described.

Referring to FIGS. 1, 2, 3A and 3B, the uncured skin panel 106 to be bagged includes twelve stringers 107. Each of the stringers 107 is associated with a corresponding one of the N/C controlled columns 110 on the leading edge of the gantry 102 (FIG. 3B), and a corresponding one of the N/C controlled columns 112 on the trailing edge of the gantry 102 (FIG. 2).

Figure 4A:
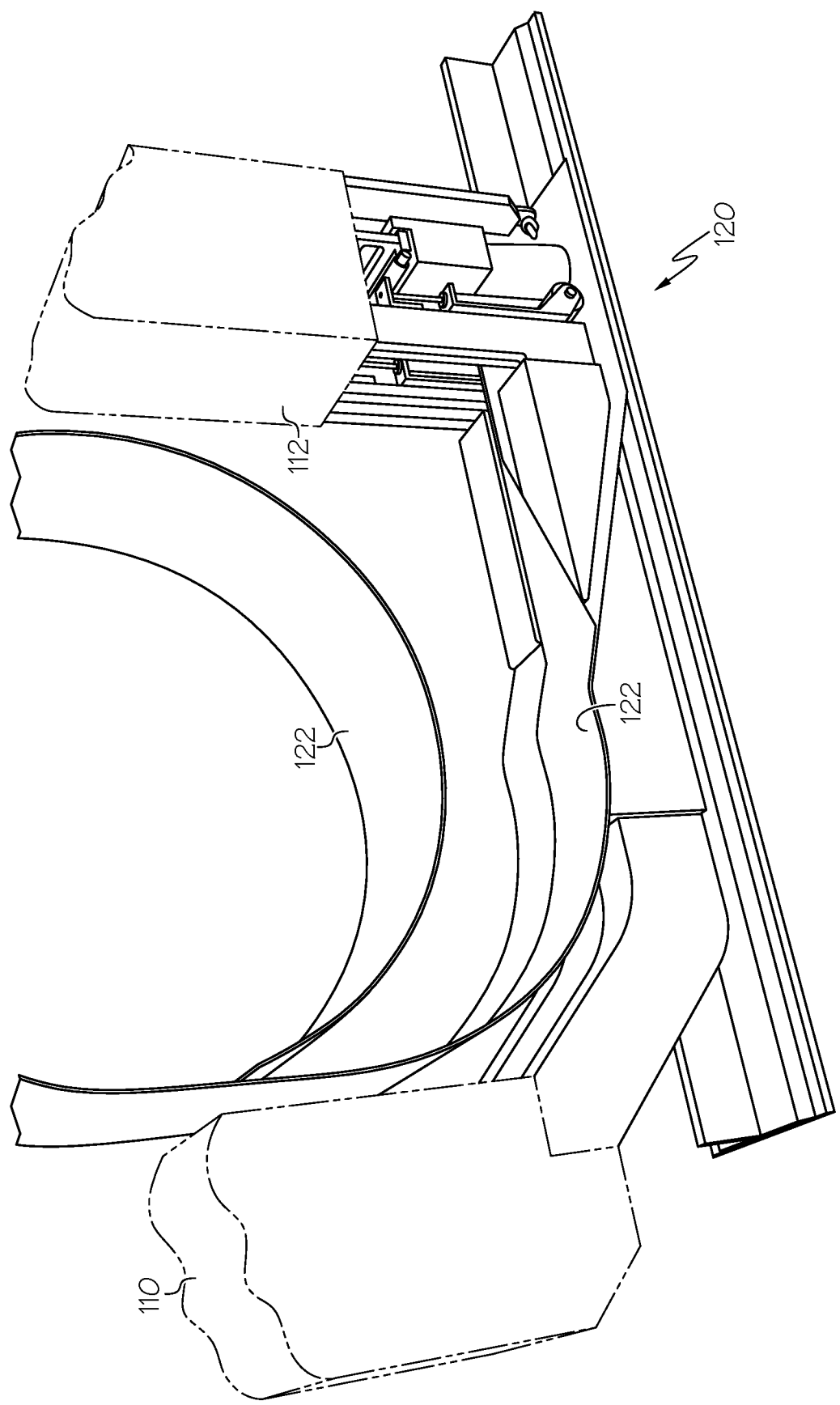
FIG. 4A is a perspective view, looking approximately in the direction of arrow "4A" in FIG. 3B.

Referring to FIG. 4A, a perspective view, looking approximately in the direction of arrow "4A" in FIG. 3B, is illustrated showing an apparatus 120 constructed in accordance with an embodiment. The apparatus 120 is shown in approximate spatial relationship to its corresponding one of the leading edge N/C controlled columns 110 and its corresponding one of the rear edge N/C controlled columns 112 (both shown in phantom lines in FIG. 4A). The apparatus 120 in FIG. 4A is also shown with the leading edge of a pre-pleated vacuum bag 122 being fed through parts of the apparatus 120, as will be described in more detail later. For purpose of clarity and explanation, FIG. 4B shows a perspective view similar to FIG. 4A of the apparatus 120 with certain parts including the vacuum bag 122 and the two N/C controlled columns 110, 112 removed.

Figure 4B:
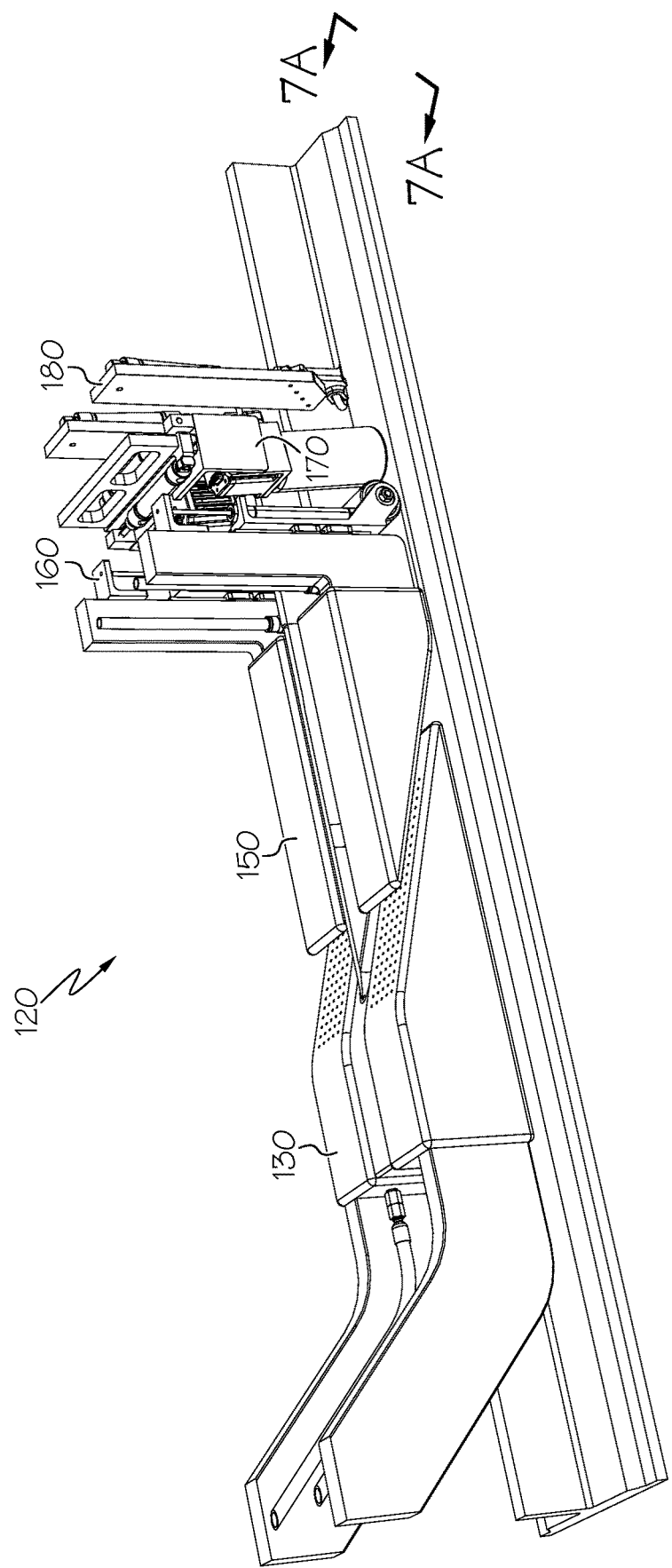
FIG. 4B is a perspective view similar to FIG. 4A with certain parts removed, and showing an apparatus constructed in accordance with an embodiment.
Figure 5B:
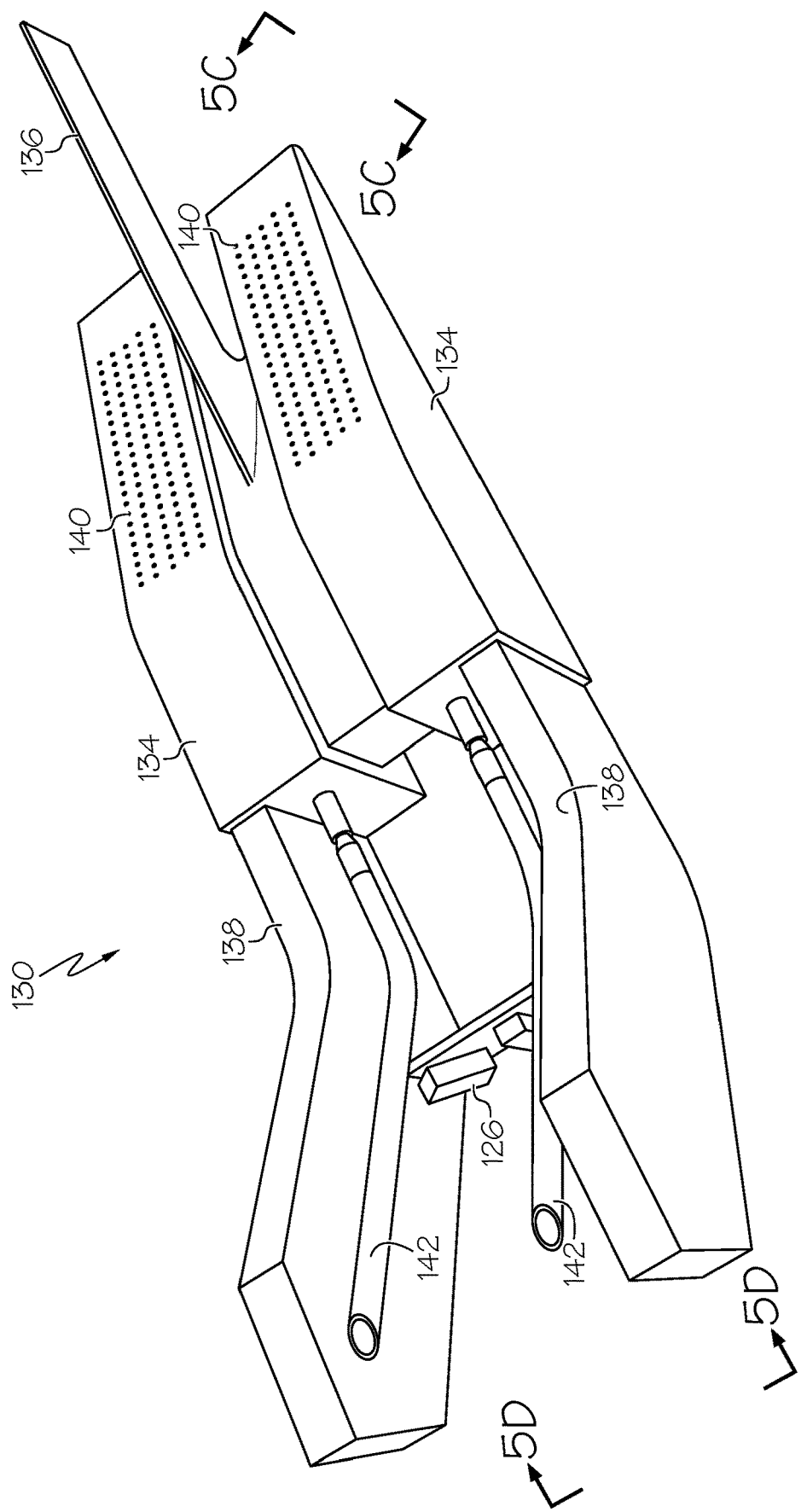
FIG. 5B is a perspective view, looking approximately in the direction of arrow "5B" down from the top side of FIG. 5A, of the leading shoe.
Figure 5C:
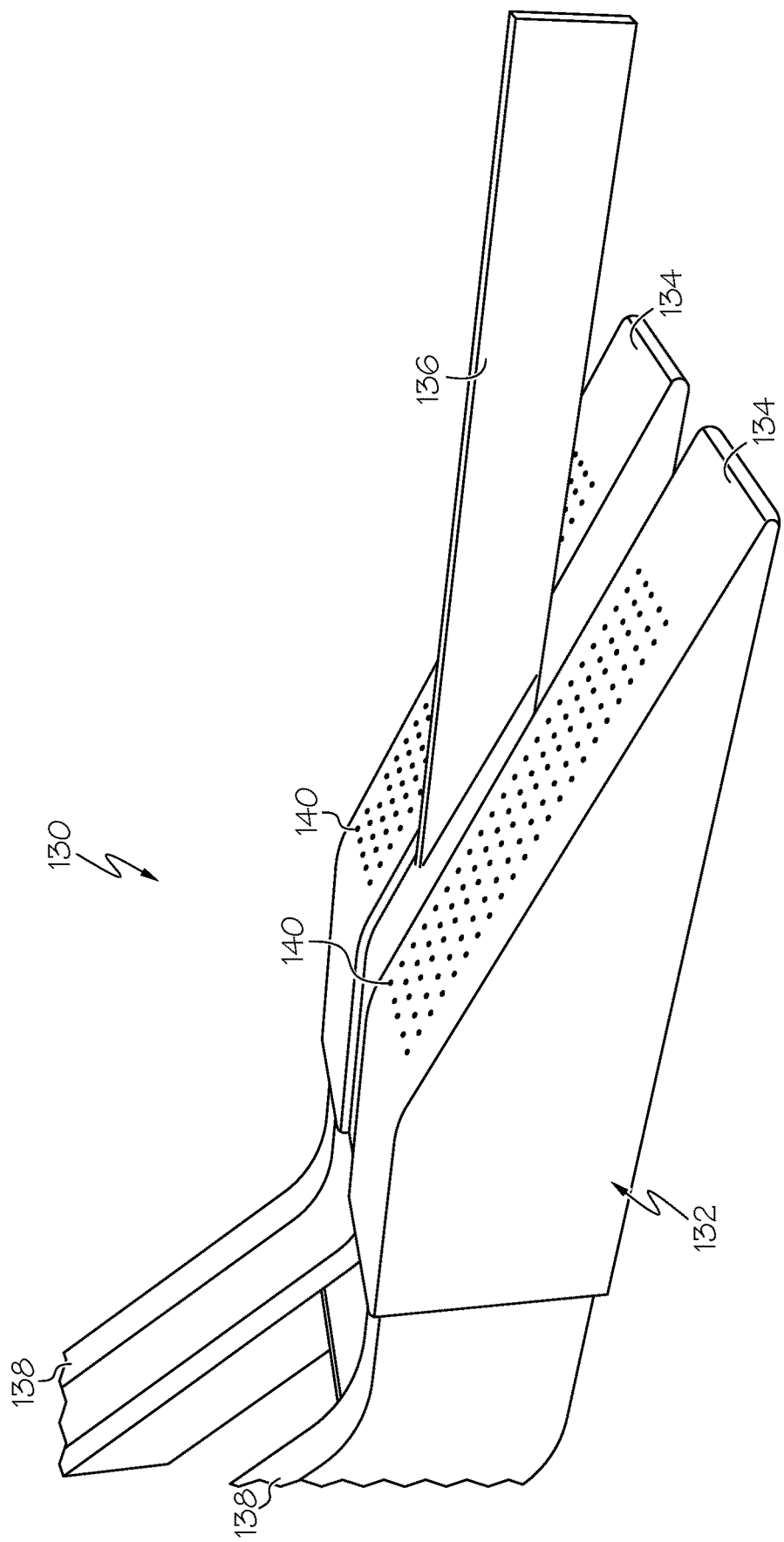
FIG. 5C is an enlarged perspective view, looking approximately in the direction of arrow "5C" from the right side of FIG. 5A, and showing a portion of the leading shoe.

Referring to FIG. 4B, the apparatus 120 comprises a leading shoe 130 for receiving the pre-pleated vacuum bag 122. More specifically, FIG. 5A is a perspective view same as FIG. 4B of only the leading shoe 130 of the apparatus 120 shown in FIG. 4B. The stringer 107 is shown in phantom lines in FIG. 5A to show the spatial relationship between the leading shoe 130 and the stringer 107. FIG. 5B is a perspective view, looking approximately in the direction of arrow "5B" down from the top side of FIG. 5A, of the leading shoe 130. FIG. 5C is an enlarged perspective view, looking approximately in the direction of arrow "5C" from the right side of FIG. 5A, and showing a portion of the leading shoe 130. FIG. 5D is an enlarged perspective view, looking approximately in the direction of arrow "5D" of FIG. 5B, and showing an optional sensor arrangement 126 associated with the leading shoe 130.

The leading shoe 130 includes a wedge portion 132 having an inclined top surface 134, a finger 136 that extends away from the inclined top surface 134 of the wedge portion 132, and a curved surface 138 for guiding the pre-pleated vacuum bag 122 along the inclined top surface 134 of the wedge portion 132 towards the finger 136 to form a pleat on the finger 136. The inclined top surface 134 of the wedge portion 132 of the leading shoe 130 includes a number of openings 140 (as best shown in FIG. 5C) through which pneumatic air can flow from a compressed air source (not shown in FIGS. 5A-5D) via pneumatic air lines 142 (as best shown in FIG. 5B) to the openings 140. The air then flows out through the openings 140.

As shown in FIG. 5D, the optional sensor arrangement 126 includes three sensors disposed on the leading shoe 130 for detecting position of the stringer relative to the leading shoe 130. Although three sensors are shown, it is conceivable that any numbers of sensors may be used. Each sensor of the optional sensor arrangement 126 provides a signal to the N/C machine indicative of either presence or absence of a stringer in the vicinity of the particular sensor.

Figure 6B:
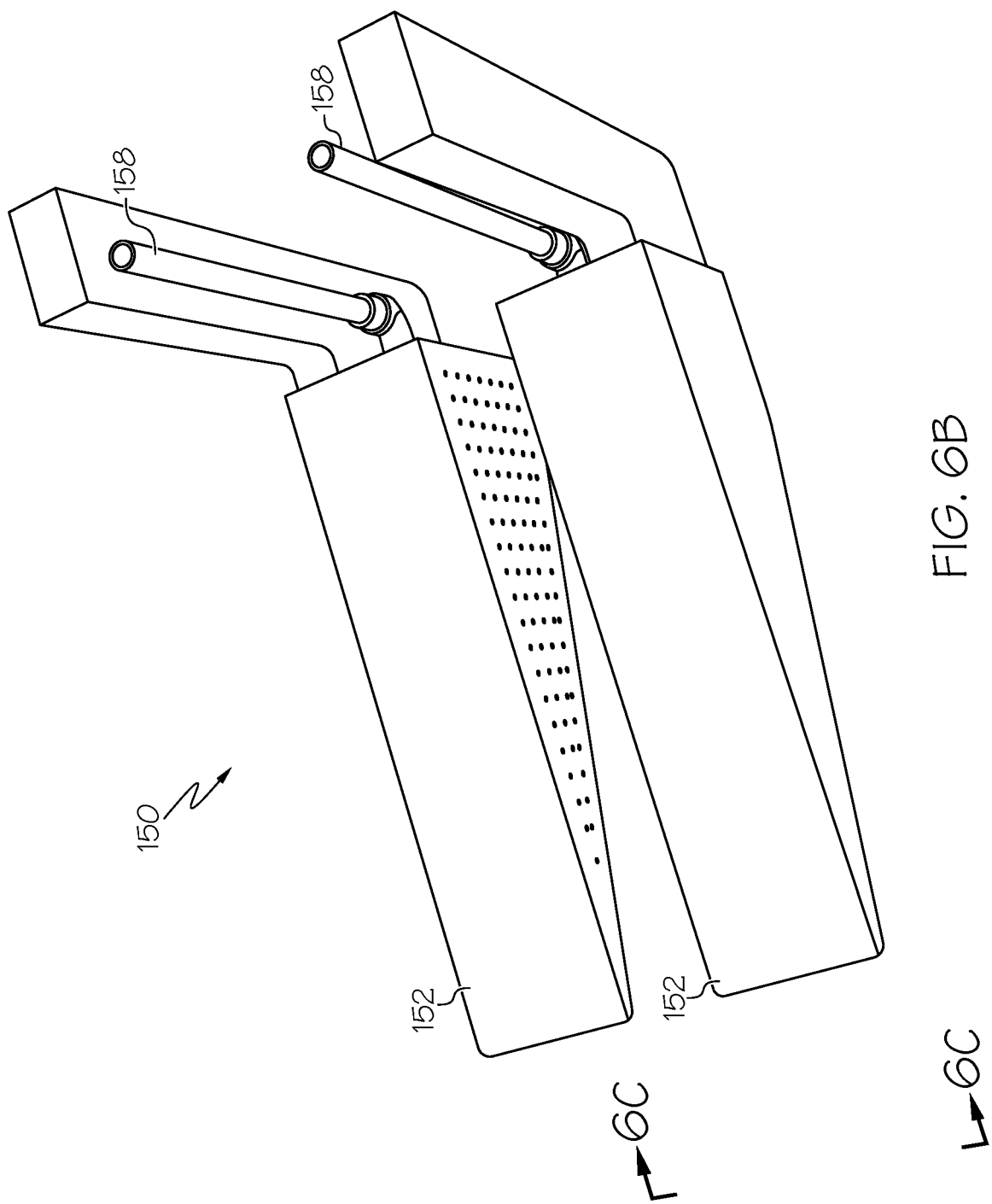
FIG. 6B is a perspective view, looking approximately in the direction of arrow "6B" down from the top side of FIG. 6B, of the trailing shoe.
Figure 6C:
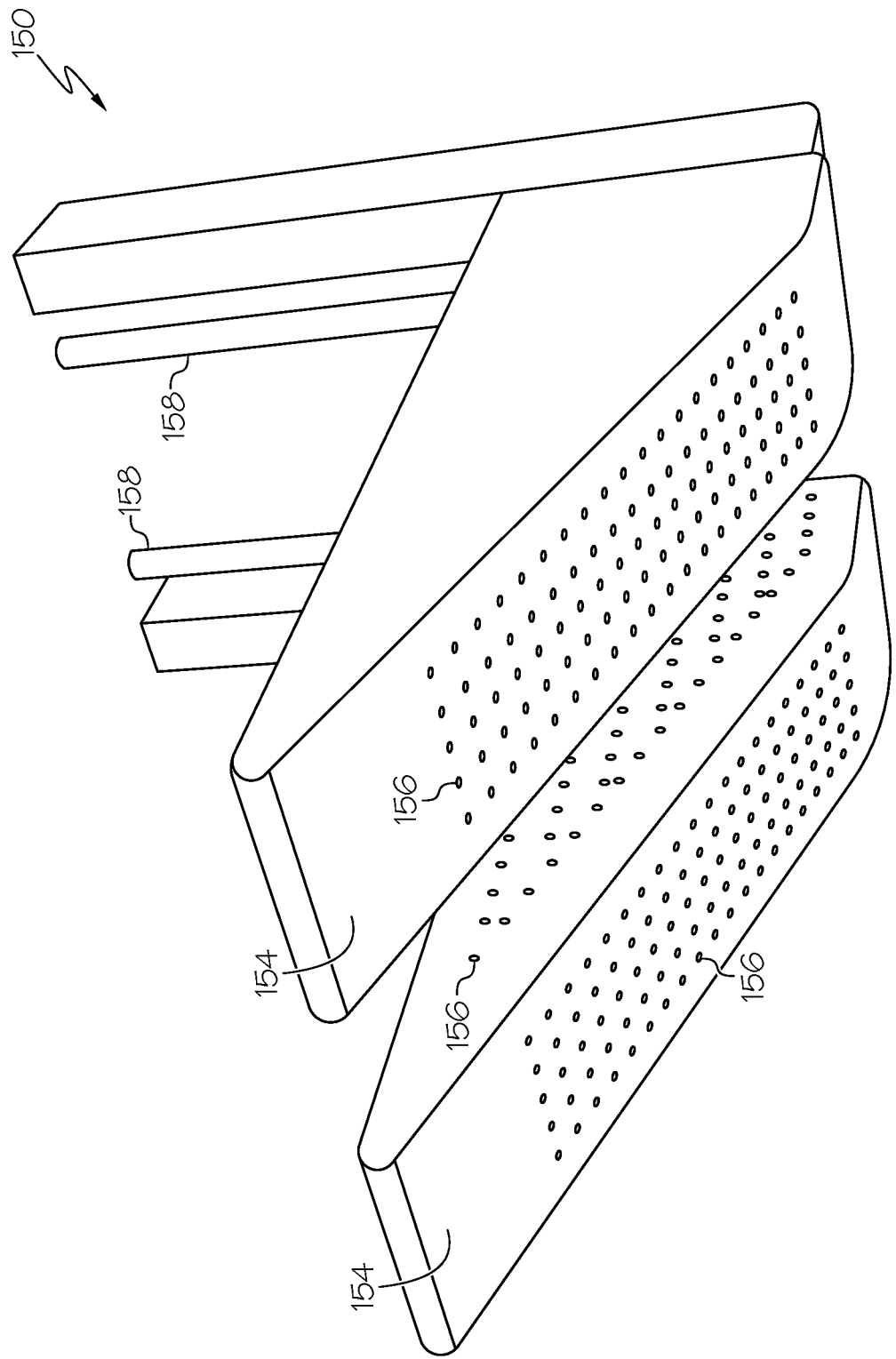
FIG. 6C is a perspective view, looking approximately in the direction of arrow "6C" up from the bottom side of FIG. 6A, of the trailing shoe.

Referring to FIG. 4B, the apparatus 120 also comprises a trailing shoe 150. More specifically, FIG. 6A is a perspective view same as FIG. 4B of only the trailing shoe 150 of the apparatus 120 shown in FIG. 4B. The trailing shoe 150 includes a pair of wedge members 152 between which the finger 136 of the leading shoe 130 extends. The stringer 107 is shown in phantom lines in FIG. 6A to show the spatial relationship between the trailing shoe 150 and the stringer 107. FIG. 6B is a perspective view, looking approximately in the direction of arrow "6B" down from the top side of FIG. 6A, of the trailing shoe 150. FIG. 6C is a perspective view, looking approximately in the direction of arrow "6C" up from the bottom side of FIG. 6B, of the trailing shoe 150.

Each of the wedge members 152 has an inclined bottom surface 154 that faces the inclined top surface 134 of the wedge portion 132 of the leading shoe 130. The inclined bottom surface 154 of each of the wedge members 152 of the trailing shoe 150 includes a number of openings 156 (as best shown in FIG. 6C) through which pneumatic air can flow from a compressed air source (not shown in FIGS. 6A-6C) via pneumatic air lines 158 (as best shown in FIG. 6B) to the openings 156. The air then flows out through the openings 156.

The air that flows out of the openings 140 on the inclined top surface 134 of the wedge portion 132 of the leading shoe 130 and the air that flows out of the openings 156 on the inclined bottom surfaces 154 of the wedge members 152 of the trailing shoe 150 cooperate together to reduce drag of the pre-pleated vacuum bag 122 as the pre-pleated vacuum bag 122 is being guided between the inclined top surface 134 of the leading shoe 130 and the inclined bottom surfaces 154 of the trailing shoe 150.

Although not shown, like the leading shoe 130 shown in FIG. 5D, it is conceivable that a number of sensors may be optionally disposed on the trailing shoe 150 for detecting position of the stringer 107 relative to the trailing shoe 150.

Figure 7A:
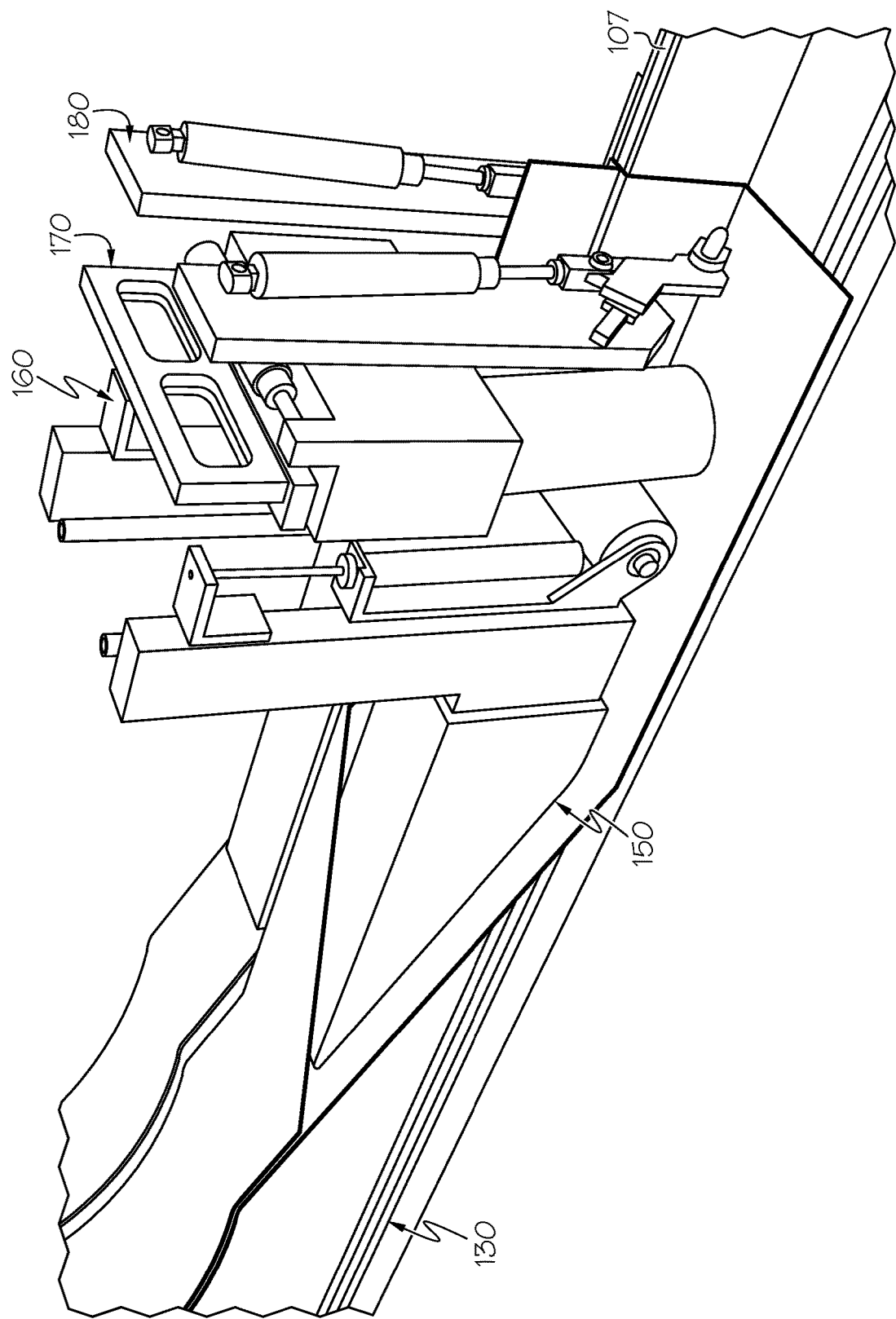
FIG. 7A is a perspective view, looking approximately in the direction of arrow "7A" shown in FIG. 4B, and showing three compaction roller assemblies.
Figure 7B:
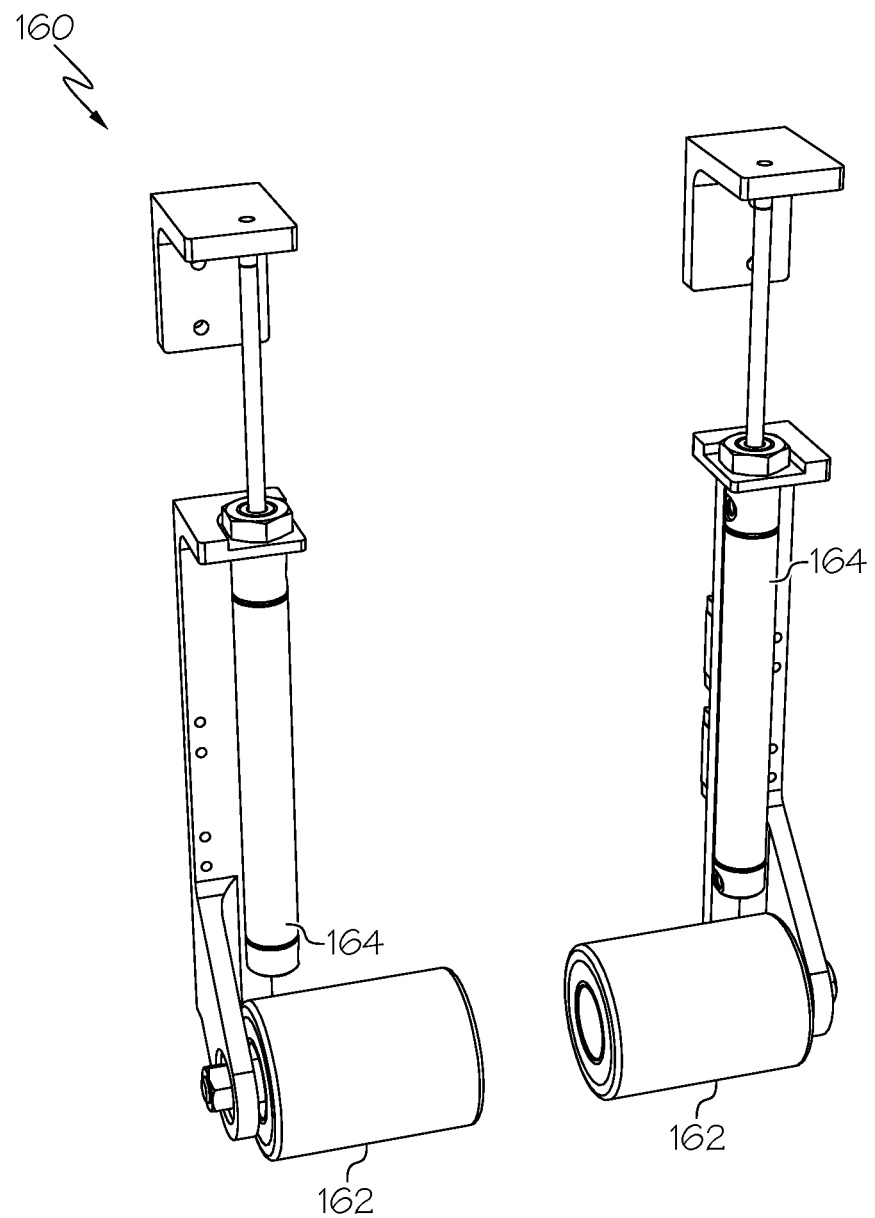
FIG. 7B is a perspective view of a first compaction roller assembly of the three compaction roller assemblies of FIG. 7A.
Figure 7C:
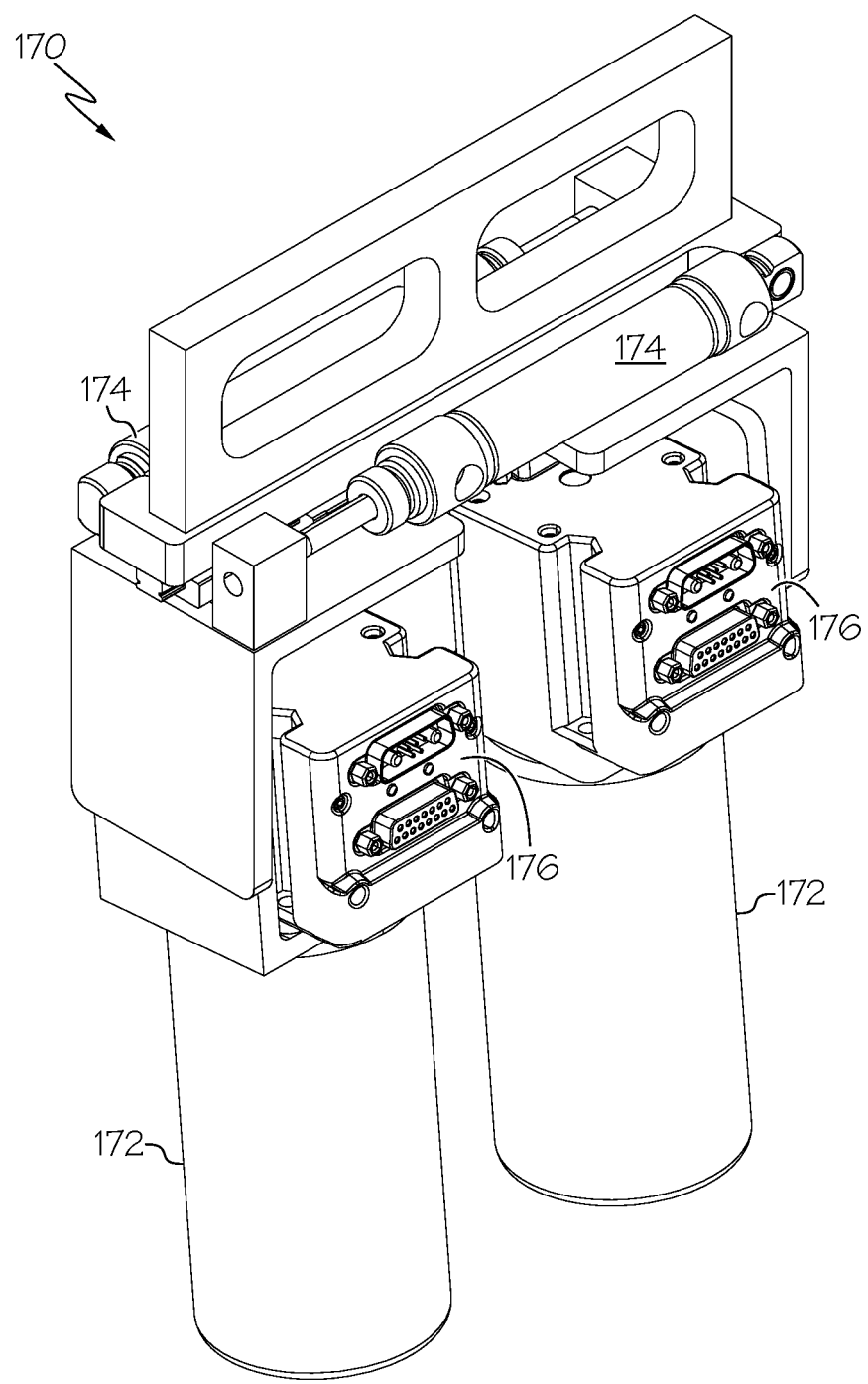
FIG. 7C is a perspective view of a second compaction roller assembly of the three compaction roller assemblies of FIG. 7A.
Figure 7D:
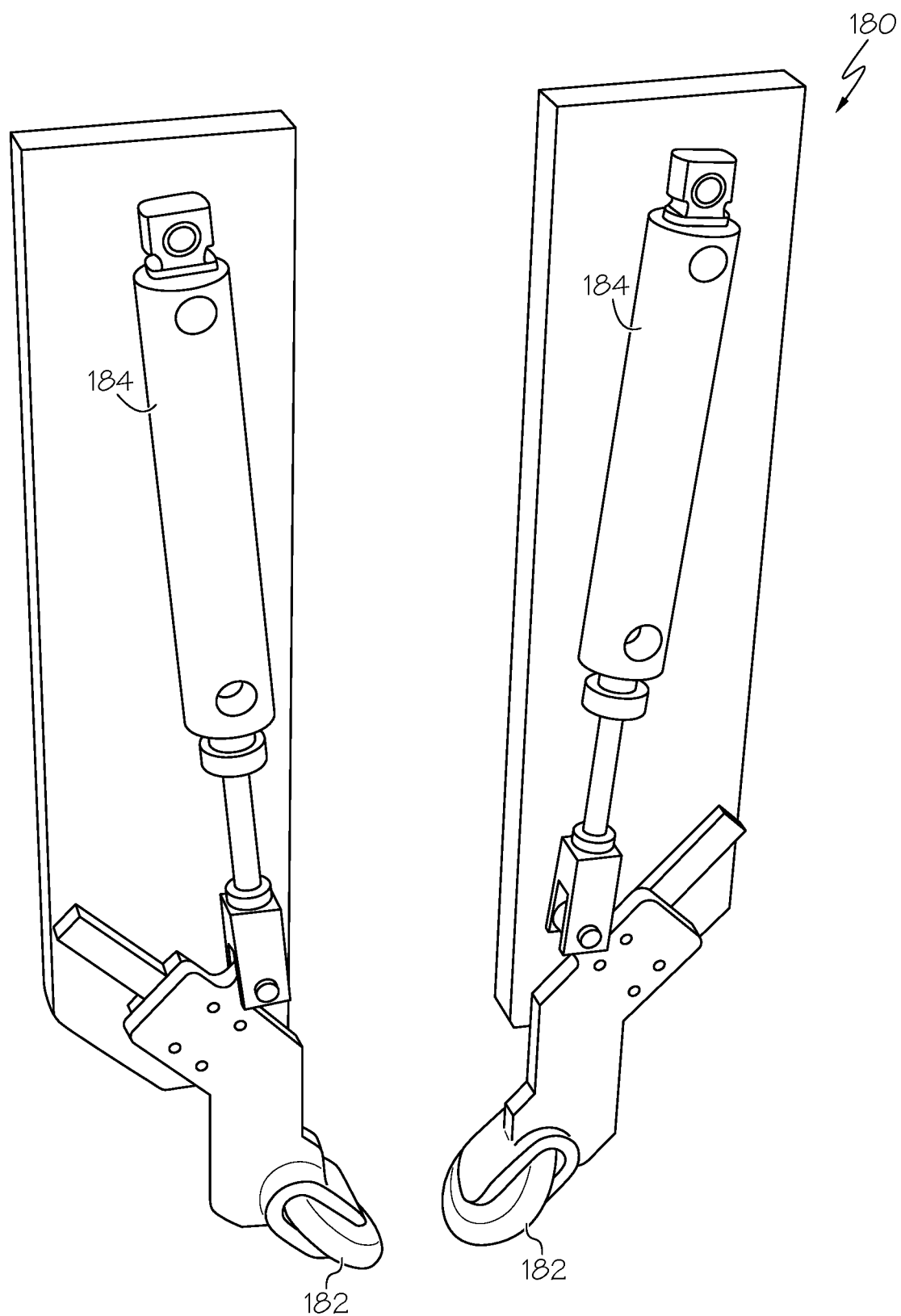
FIG. 7D is a perspective view of a third compaction roller assembly of the three compaction roller assemblies of FIG. 7A.

Referring to FIG. 4B, the apparatus 120 further comprises at least one roller assembly for compacting the pleat that has been formed in the vacuum bag 122 and positioned over the stringer 107. More specifically, FIG. 7A is a perspective view, looking approximately in the direction of arrow "7A" shown in FIG. 4B, and showing three compaction roller assemblies, which are designated with reference numerals "160", "170" and "180". FIG. 7B is a perspective view of a first compaction roller 160 assembly of the three compaction roller assemblies of FIG. 7A. FIG. 7C is a perspective view of a second compaction roller assembly 170 of the three compaction roller assemblies of FIG. 7A. FIG. 7D is a perspective view of a third compaction roller assembly 180 of the three compaction roller assemblies of FIG. 7A.

The first roller assembly 160 (FIG. 7B) includes a pair of horizontal rollers 162 for compacting a horizontal portion of the vacuum bag 122 that is adjacent to the formed pleat in a first direction against a horizontal surface portion of the uncured skin panel 106, which will be described later. The first roller assembly 160 also includes a pair of pneumatically controllable dual-action cylinders 164 for, when pneumatically controlled, moves the pair of horizontal rollers 162 either towards or away from the horizontal surface portion of the uncured skin panel 106.

The second roller assembly 170 (FIG. 7C) includes a pair of vertical rollers 172 for compacting a vertical portion of the formed pleat in a second direction that extends transverse to the first direction against a vertical surface portion of the stringer 107, which will be described later. The second roller assembly 170 also includes a pair of pneumatically controllable dual-action cylinders 174 for, when pneumatically controlled, moves the pair of vertical rollers 172 either towards or away from vertical surface portion of the stringer 107. The second roller assembly 170 further includes a pair of electrically controllable drive motors 176 for, when electrically controlled, rotates the pair of vertical rollers 172 about their longitudinal axes.

The third roller assembly 180 (FIG. 7D) includes a pair of forming rollers 182 for compacting a radius portion of the formed pleat in a third direction that extends between the first and second directions against a region that interconnects the horizontal surface portion of the uncured skin panel 106 and the vertical surface portion of the stringer 107, which will be described later. The third roller assembly 180 includes a pair of pneumatically controllable dual-action cylinders 184 for, when pneumatically controlled, moves the pair of forming rollers 182 either towards or away from the radius surface portion that interconnects the horizontal surface portion of the uncured skin panel 106 and the vertical surface portion of the stringer 107.

The pneumatically controllable dual-action cylinders 164, 174, 184 used in the three roller assemblies 160, 170, 180 may comprise model "Round Line" & "Original Line Air Cylinder" commercially available from Bimba Corporation located in University Park, Ill. Dual-action cylinders from other manufacturers may be used. The drive motors 176 used in the second roller assembly 170 may comprise model "SM23165DT SmartMotor" commercially available from Moog Animatics located in Mountain View, Calif. Drive motors from other manufacturers may also be used.

Figure 8B:
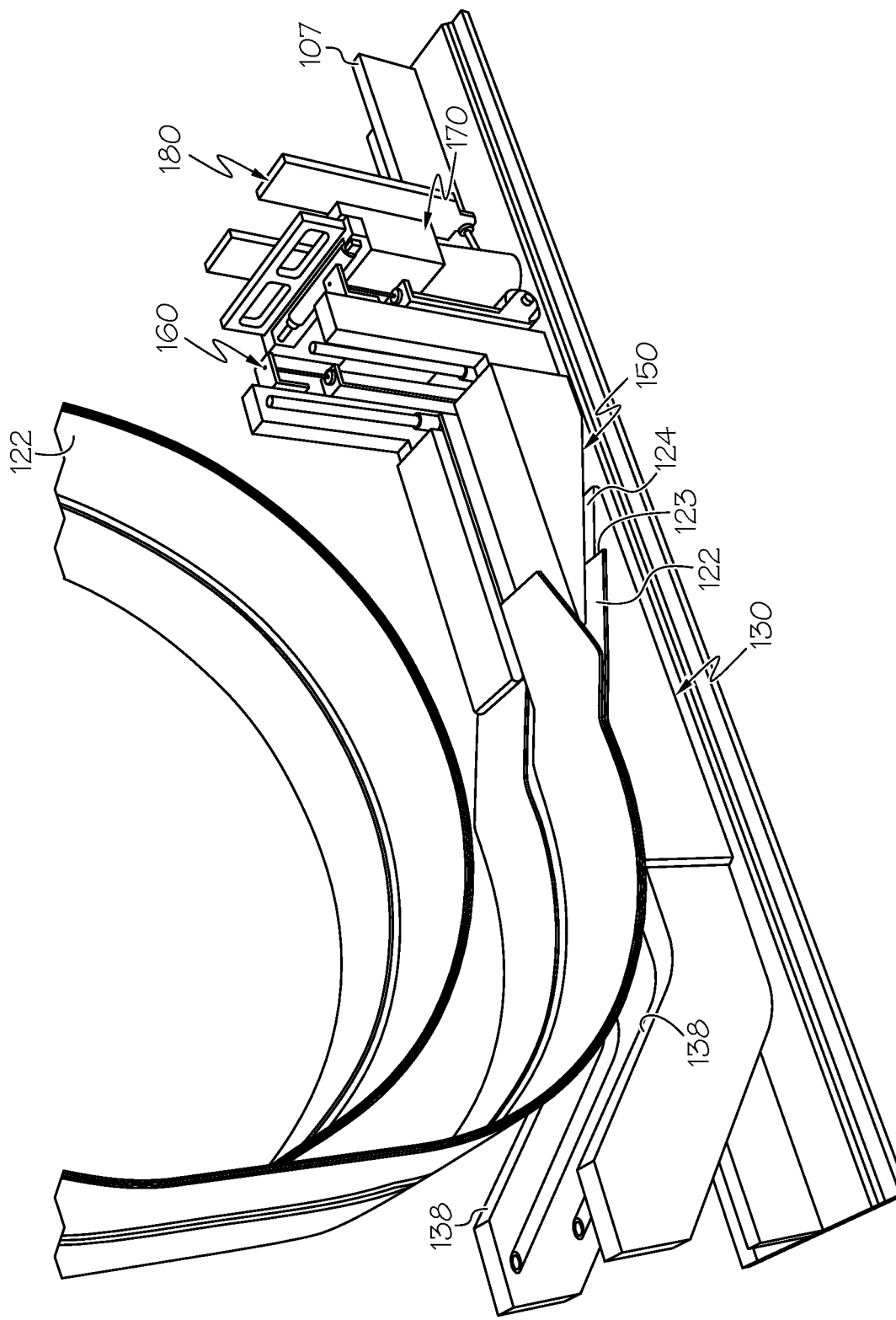
Figure 8C:
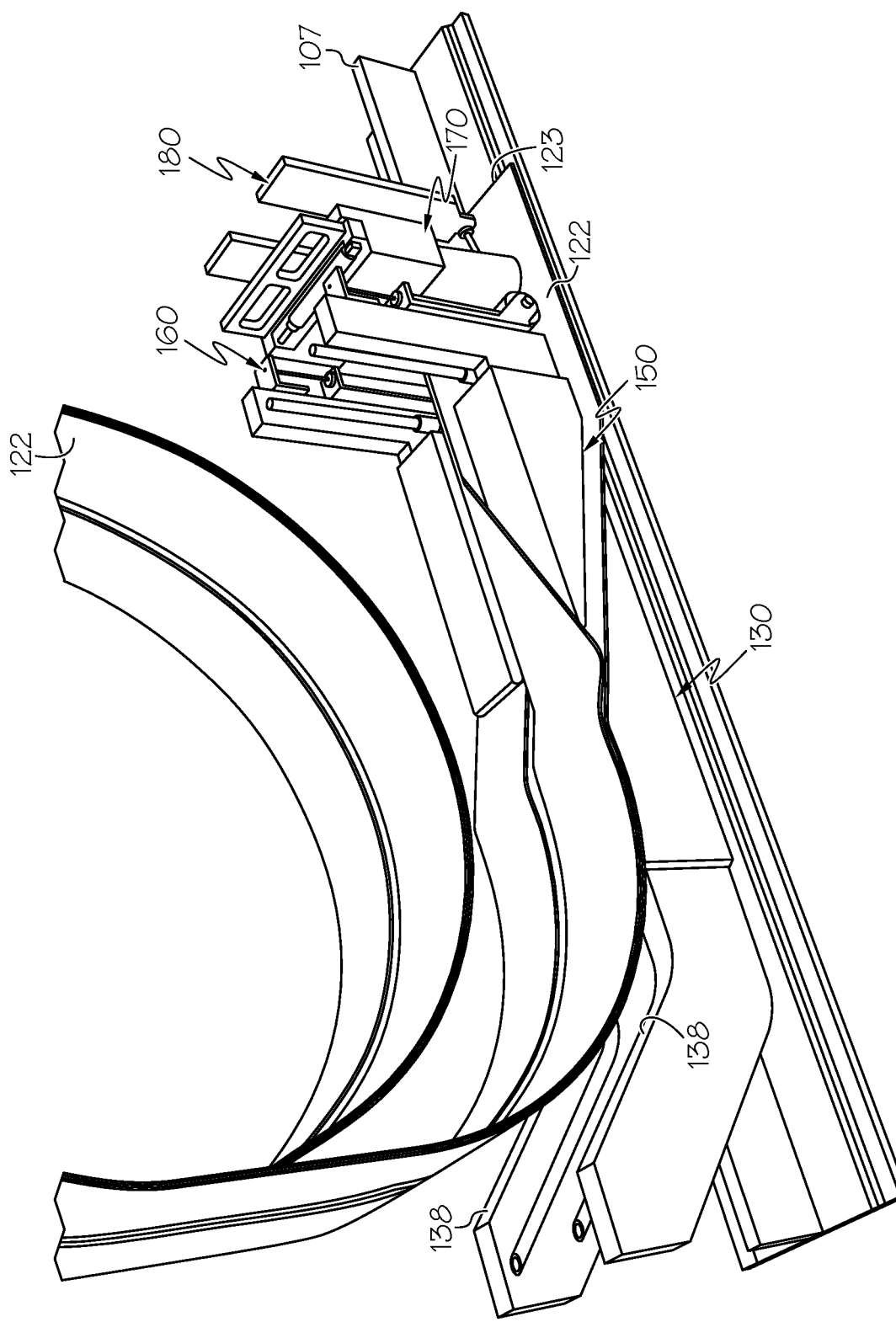

Referring to FIGS. 8A, 8B and 8C, the cooperation of the leading shoe 130 and the trailing shoe 150 to form a pleat from the pre-pleated vacuum bag 122 is illustrated. More specifically, FIG. 8A shows the vacuum bag 122 being unrolled and a leading edge 123 of the vacuum bag 122 being guided along the curved surface 138 of the leading shoe 130. FIG. 8B shows the leading edge 123 of the vacuum bag 122 just about to be threaded into a gap 124 between the inclined top surface 134 of the leading shoe 130 and inclined bottom surfaces 154 of the trailing shoe 150. The trailing shoe 150 may be retracted away from the leading shoe 130 to increase the size of the gap 124 to facilitate threading of the leading edge 123 of the vacuum bag 122 into the gap 124. FIG. 8C shows the leading edge 123 of the vacuum bag 122 threaded all the way through the gap 124. When the leading edge 123 of the vacuum bag 122 is threaded all the way through the gap 124, a pleat 190 of the pre-pleated vacuum bag 122 is formed into position over the stringer 107.

Figure 8D:
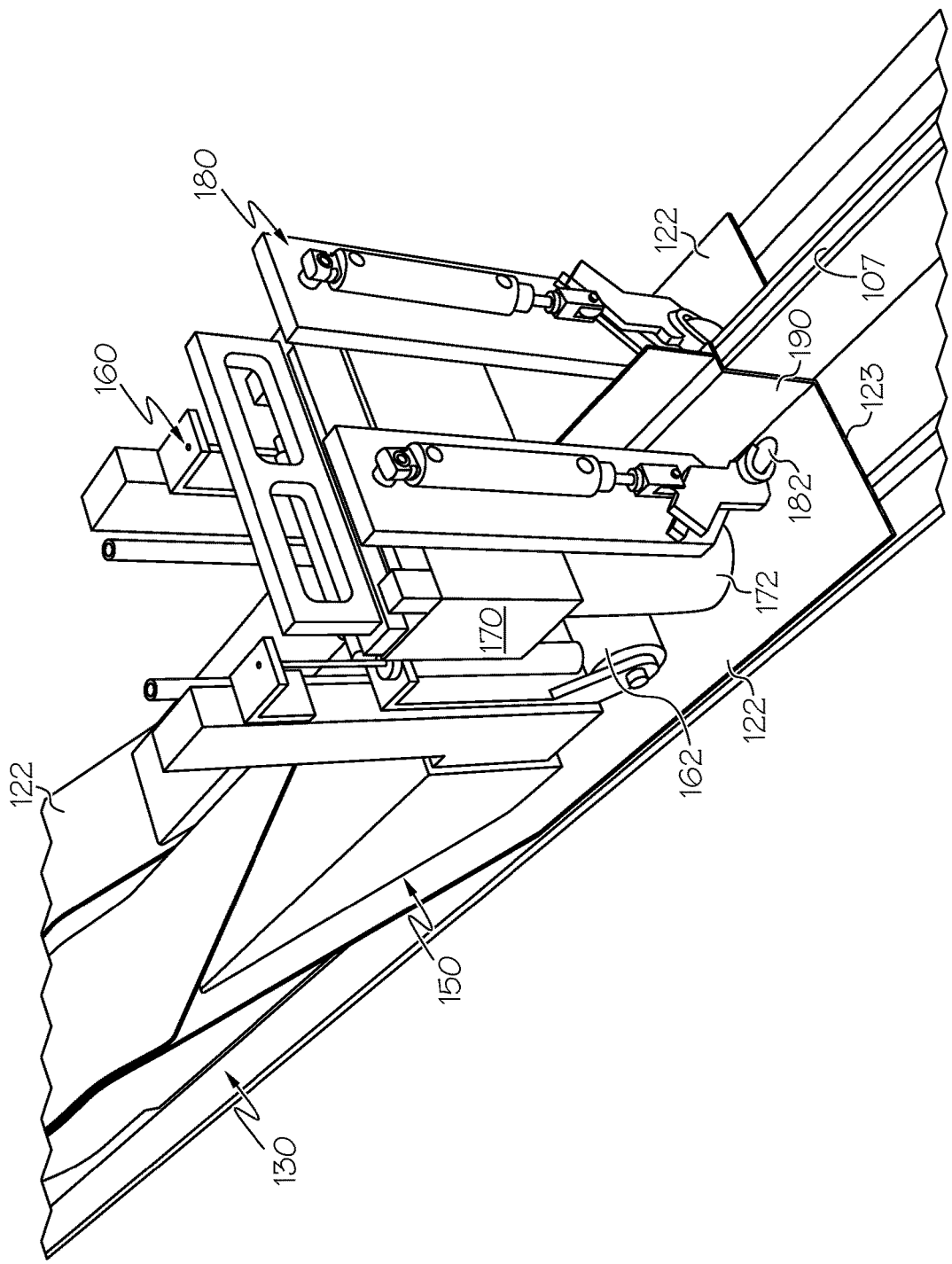
Figure 8E:
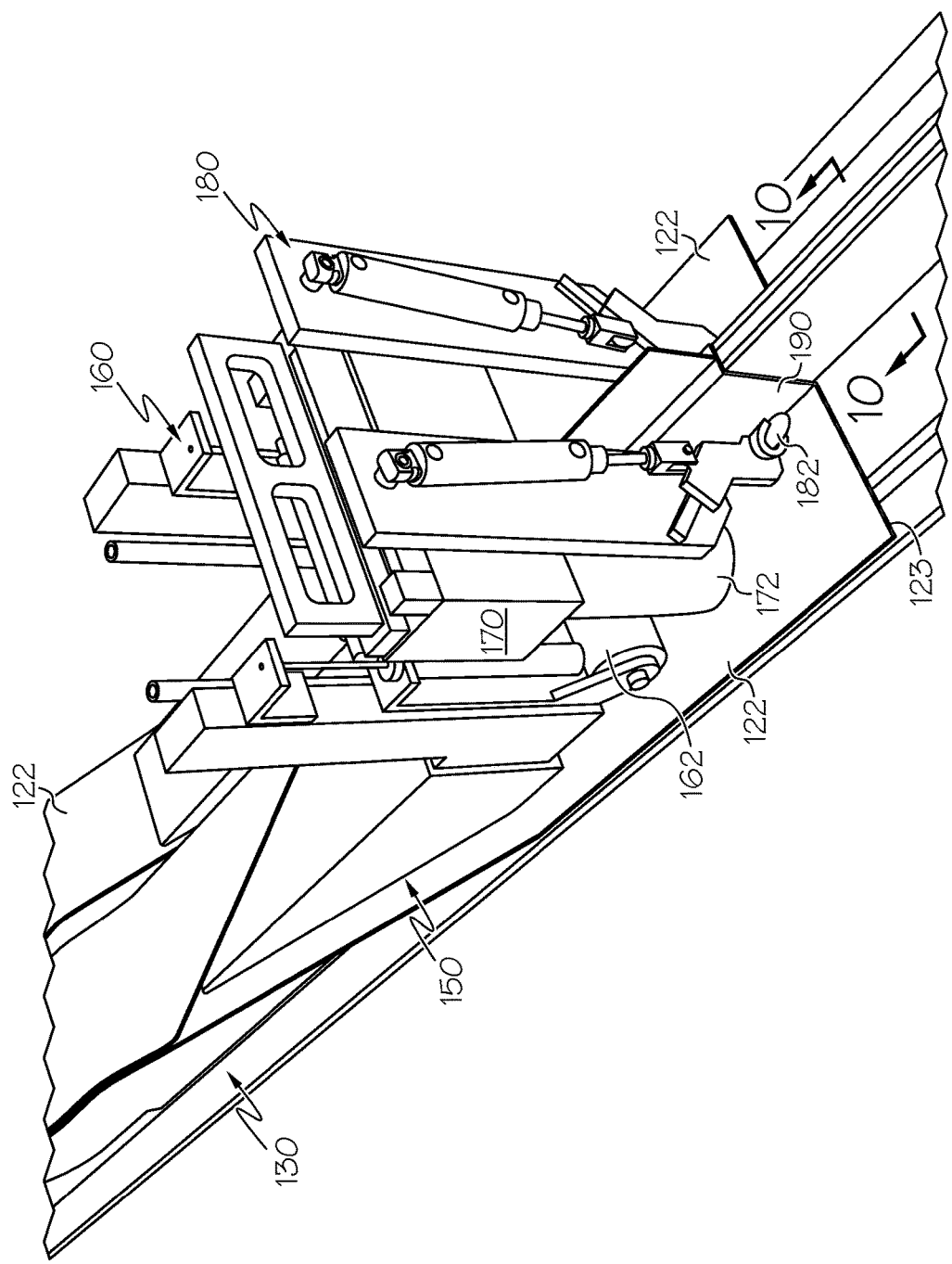

Referring to FIGS. 8D and 8E, the cooperation of the three compaction roller assemblies 160, 170, 180 to compact the pleat 190 is illustrated. More specifically, FIG. 8D shows the rollers of the three roller assemblies 160, 170, 180 in retracted positions. This allows the formed pleat 190 to be moved into position either under or between rollers 162, 172, 182 so that the rollers 162, 172, 182 can compact the pleat 190 against the stringer 107. FIG. 8E shows the rollers of the three roller assemblies 160, 170, 180 in actuated positions to compact the pleat against the stringer 107. It should be apparent that there is a one-to-one relationship between the pleat 190, the rollers 162, 172, 182, and the stringer 107.

Figure 9:
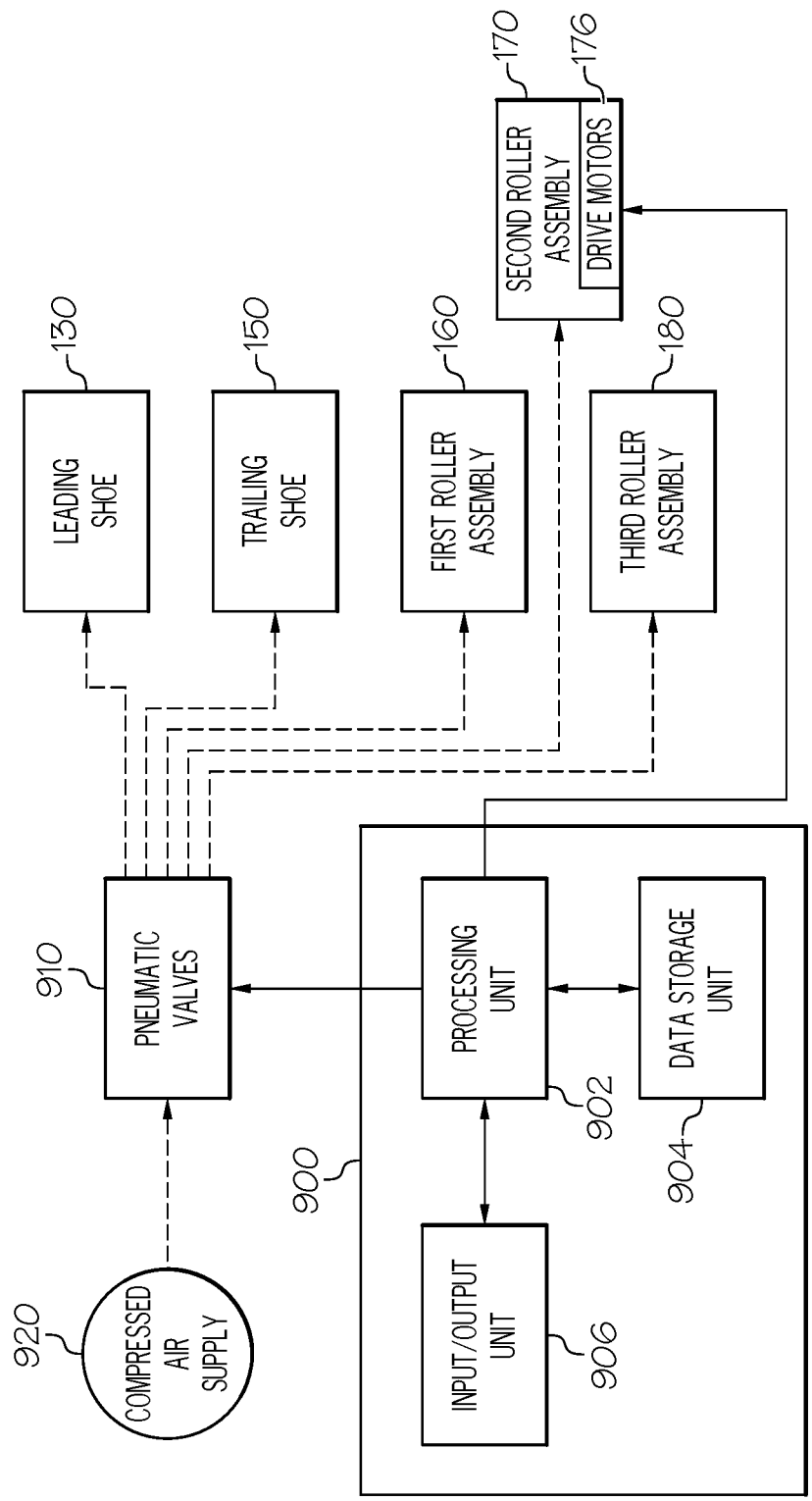
FIG. 9 shows an example computer system associated with the vacuum bagging machine of FIG. 1 and capable of forming and positioning a pleat over a stringer of an uncured skin panel.

Referring to FIG. 9, an example computer system 900 capable of controlling the vacuum bagging machine 100 including the apparatus 120 is illustrated. Electrical lines are shown as solid lines, and pneumatic lines are shown as dashed lines. Although the leading shoe 130 and the trailing shoe 150 are shown in FIG. 9 as being powered by a pneumatic source, it is conceivable that they be powered by an electric source.

Computer system 900 includes processing unit 902 that executes instructions stored in internal data storage unit 904, external data storage unit (not shown), or a combination thereof. Processing unit 902 may comprise any type of technology. For example, processing unit 902 may comprise a general-purpose electronic processor. Other types of processors and processing unit technologies are possible. Internal data storage unit 904 may comprise any type of technology. For examples, internal data storage unit 904 may comprise random access memory (RAM), read only memory (ROM), solid state memory, or any combination thereof. Other types of memories and data storage unit technologies are possible.

Computer system 900 further includes a number of input/output (I/O) devices 906 that may comprise any type of technology. For example, I/O devices 906 may comprise a keypad, a keyboard, a touch-sensitive display screen, a liquid crystal display (LCD) screen, a microphone, a speaker, or any combination thereof. Other types of I/O devices and technologies are possible.

The processing unit 902 controls a number of pneumatic valves 910 to control air flow from a compressed air supply 920 to the leading shoe 130, the trailing shoe 150, the first compaction roller assembly 160, the second compaction roller assembly 170, and the third compaction roller assembly 180, as already described hereinabove. The processing unit 902 also controls the drive motors 176 of the second compaction roller assembly 170, also as already described hereinabove.

Figure 10:
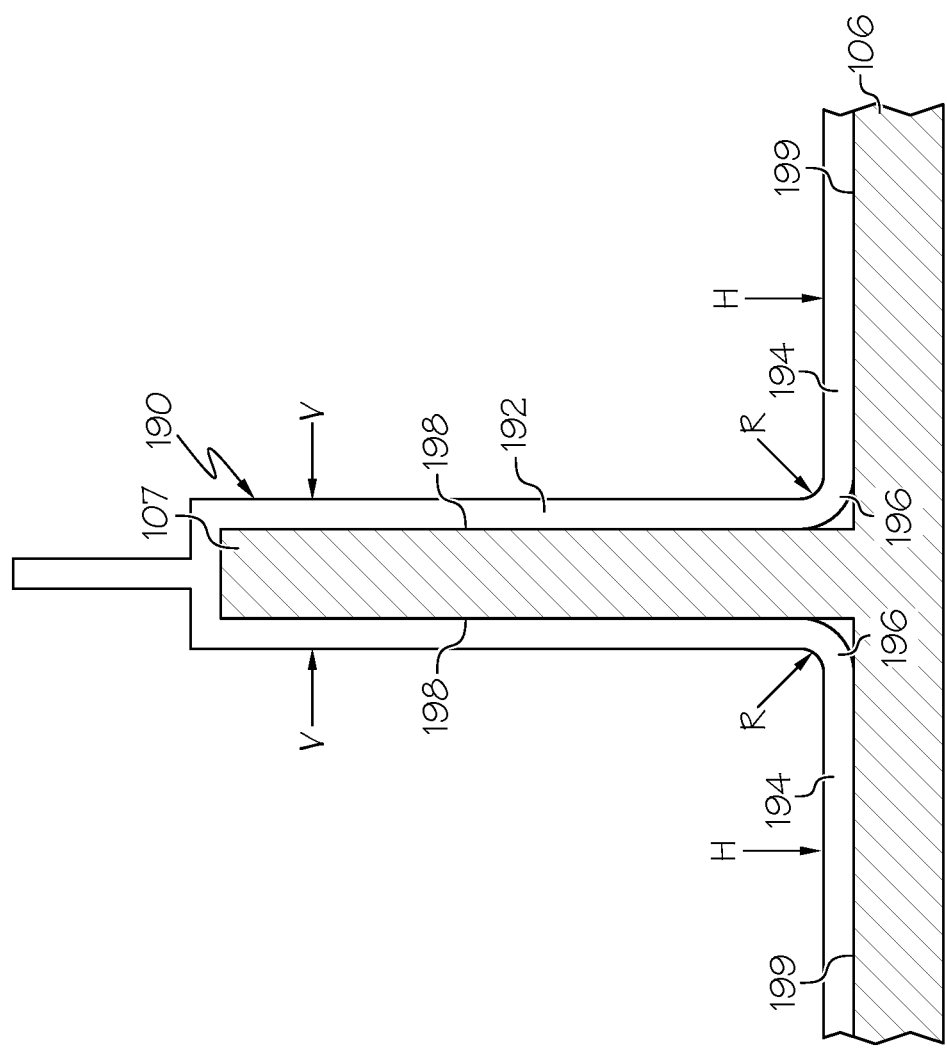
FIG. 10 is a sectional elevational view, looking approximately in the direction of arrow "10" of FIG. 8E, and showing a formed pleat of the vacuum bag that is in position over a stringer of an uncured skin panel.

Referring to FIG. 10, a sectional elevational view, looking approximately in the direction of arrow "10" of FIG. 8E, is illustrated. More specifically, FIG. 10 shows a pleat 190 that has been formed in position over the stringer 107. The formed pleat 190 has vertical portions 192 that are adjacent to vertical surface portions 198 of the stringer 107, horizontal portions 194 that are adjacent to horizontal surface portions 199 of the uncured skin panel 106, and radius portions 196 that interconnect the horizontal portions 194 and vertical portions 192 of the pleat 190.

When the first compaction roller assembly 160 is actuated, the pair of horizontal rollers 162 (FIG. 7B) forces the horizontal portions 194 of the pleat 190 in a direction designated with arrows "H" in FIG. 10 against horizontal surface portions 199 of the uncured skin panel 106. When the second compaction roller assembly 170 (FIG. 7C) is actuated, the pair of vertical rollers 172 forces the vertical portions 192 of the pleat 190 in a direction designated with arrows "V" in FIG. 10 against vertical surface portions 198 of the stringer 107. The drive motors 176 actively rotate the pair of vertical rollers 172 about their longitudinal central axes to prevent bunching of the vacuum bag 122. When the third compaction roller assembly 180 (FIG. 7D) is actuated, the pair of forming rollers 182 forces the radius portions 196 of the pleat 190 in a direction designated with arrows "R" in FIG. 10 against regions that interconnect the horizontal surface portions 199 of the uncured skin panel 106 and the vertical surface portions 198 of the stringer 107. Although the rollers 162, 172, 182 are applied in the order described hereinabove to form the pleat 190, it is conceivable that the rollers 162, 172, 182 be applied in any order, or even simultaneously (i.e., at the same time) to form the pleat 190.

Figure 11:
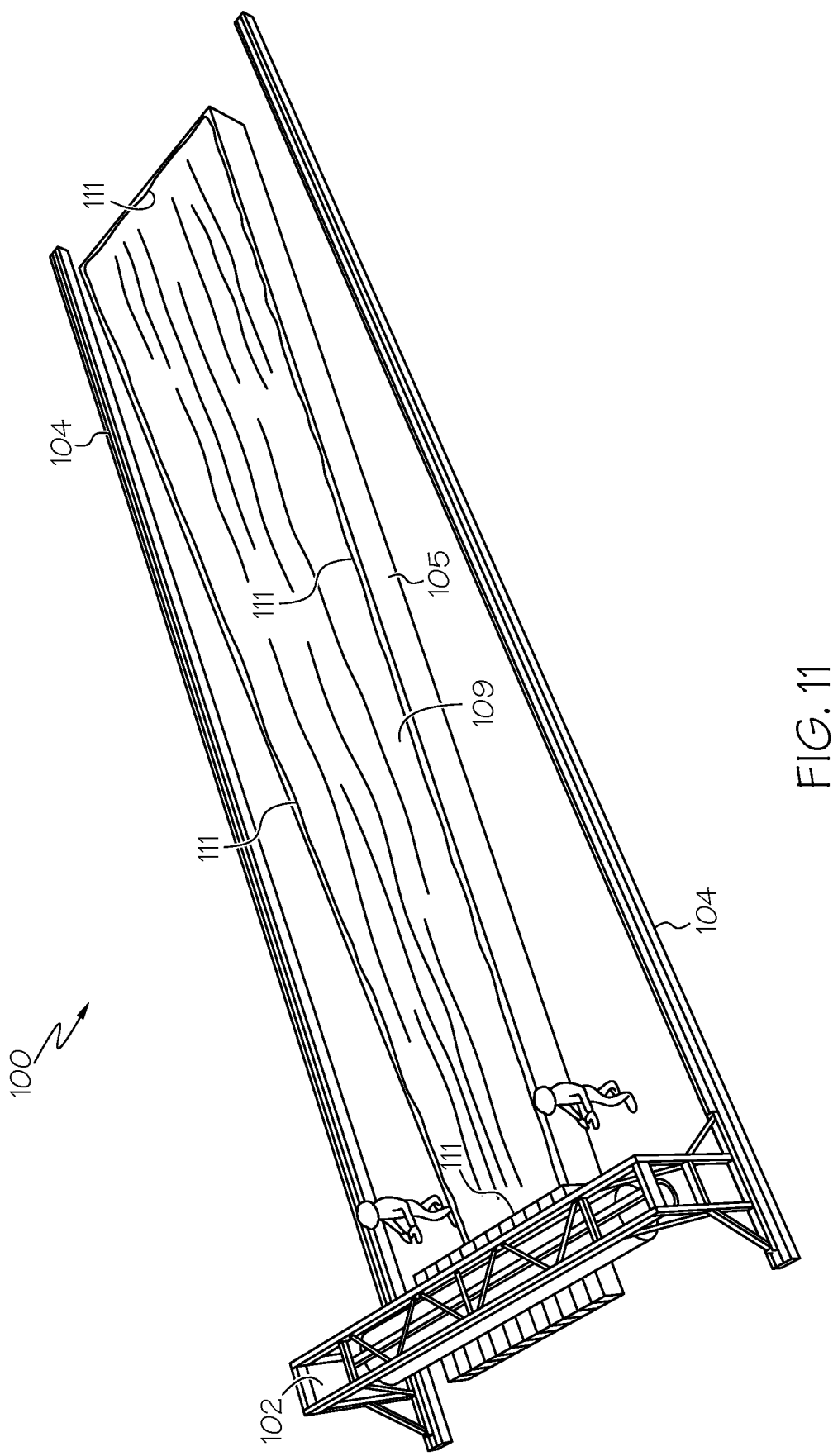
FIG. 11 is a perspective view similar to FIG. 1, and showing the vacuum bagging machine in a finished position.

The rollers of the three roller assemblies 160, 170, 180 are retracted and actuated at a rate as needed to form the pleat 190 along the entire extent of the stringer 107 as the vacuum bag 122 is continuously unrolled across the uncured skin panel 106 including the stringers 107. The pleat 190 has been formed along the entire extent of the stringer 107 when the gantry 102 has moved along the pair of slide rails 104 from its starting position shown in FIG. 1 to its finished position such as shown in FIG. 11. Other pleats associated with the other stringers 107 are formed and compacted in the same way as described hereinabove. The operation of a set of pleat-forming rollers (e.g., the rollers 162, 172, 182) associated with a particular stringer is controlled by the N/C program of the N/C machine to form the corresponding pleat. The signals from the sensors of the optional sensor arrangement 126 (FIG. 5D) may be used by the N/C program of the N/C machine to confirm the presence or absence of a stringer. Accordingly, the operation of the set of pleat-forming rollers ends when the associated stringer ends. After all of the pleats have been formed and compacted as shown in FIG. 11, edges 111 of bagged skin panel 109 are manually sealed.

Figure 12:
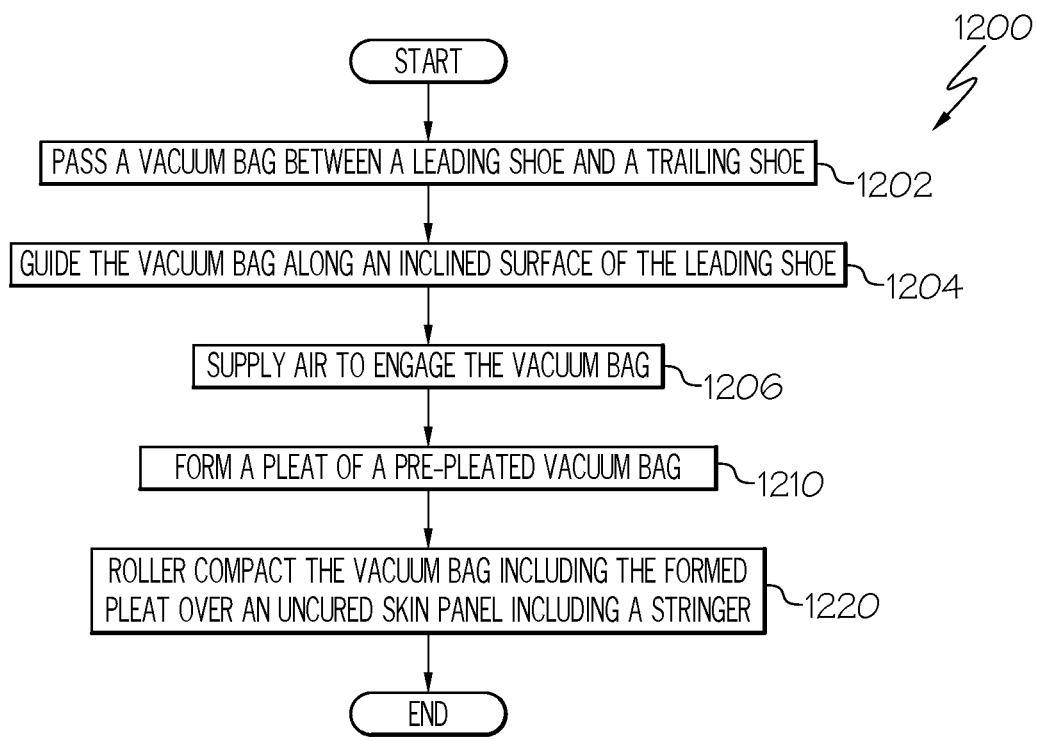
FIG. 12 is a flow diagram depicting an example method for automatically operating a vacuum bagging machine in accordance with an embodiment.

Referring to FIG. 12, flow diagram 1200 depicts an example method for automatically operating the example computer system of FIG. 9 to control operation of the vacuum bagging machine 100 to form a pleat into position over an uncured skin panel including stringers in accordance with an embodiment. In block 1202, a vacuum bag is passed between a leading shoe and a trailing shoe. In block 1204, the vacuum bag is guided along an inclined surface of the leading shoe. In block 1206, air is supplied (through openings in the inclined surface) to engage the vacuum bag. In block 1210, a pleat of the pre-pleated vacuum bag is formed. Then in block 1220, the vacuum bag including the formed pleat is roller-compacted over an uncured skin panel including a stringer. The process then ends.

Figure 13:
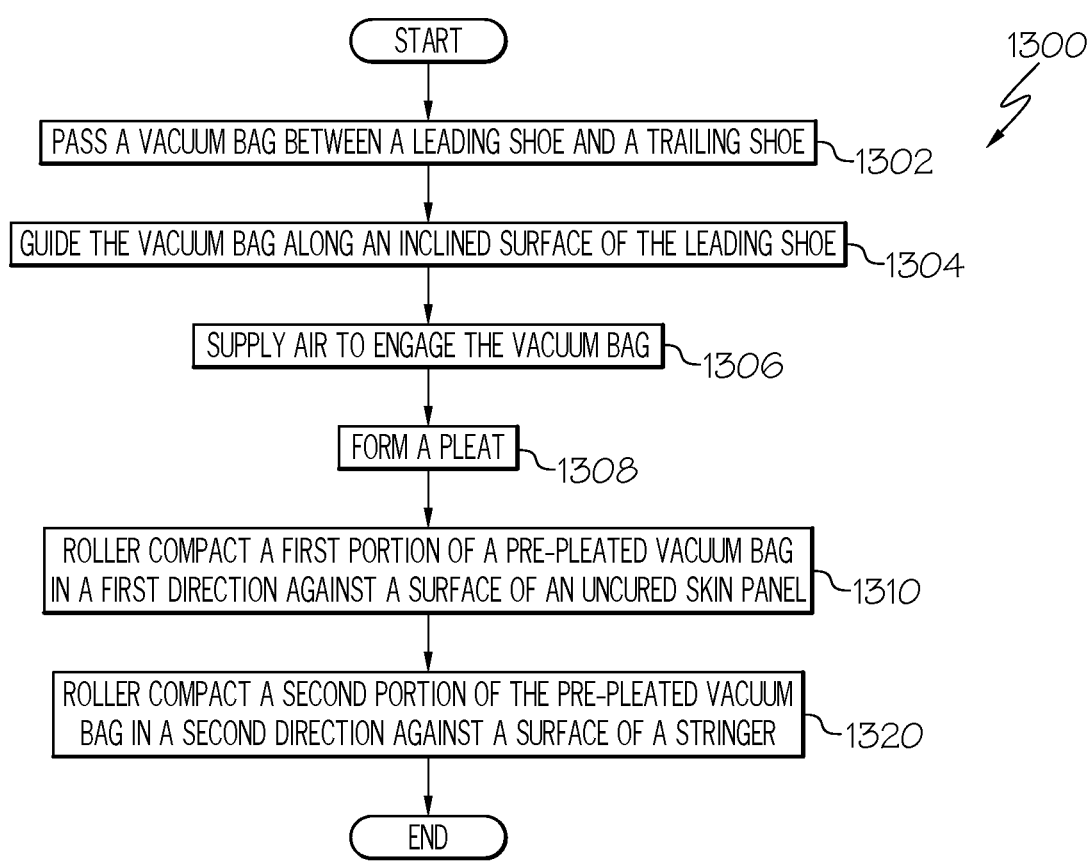
FIG. 13 is a flow diagram depicting an example method for automatically operating a vacuum bagging machine in accordance with another embodiment.

Referring to FIG. 13, flow diagram 1300 depicts an example method for automatically operating the example computer system of FIG. 9 to control operation of the vacuum bagging machine 100 to form a pleat into position over an uncured skin panel including stringers in accordance with another embodiment. In block 1302, a vacuum bag is passed between a leading shoe and a trailing shoe. In block 1304, the vacuum bag is guided along an inclined surface of the leading shoe. In block 1306, air is supplied (through openings in the inclined surface) to engage the vacuum bag. In block 1308, a pleat of the pre-pleated vacuum bag is formed. In block 1310, a first portion of the pre-pleated vacuum bag is roller compacted in a first direction against a surface of the uncured skin panel. Then in block 1320, a second portion of the pre-pleated vacuum bag is roller compacted in a second direction against a surface of the stringer. The second direction extends transverse to the first direction. The process then ends.

It should be apparent that the above-described bed vacuum bagging machine 100 removes the need for operating personnel to get up on the layup mandrel 105 on which the uncured skin panel 106 lies to manually form and position the pleats (e.g., the pleat 190 shown in FIG. 10) over the stringers 107. This not only reduces labor costs, but also reduces the time needed to form and position the pleats over the stringers. Thus, total production costs are reduced.

It should also be apparent that an automated process is provided to form the pleat and position the formed pleat over the stringer 107. The automated process reduces potential damage to the uncured skin panel 106 and the stringers 107.

Although the above description describes a pleat that is formed using a pre-pleated vacuum bag, it is conceivable that the pleat be formed using a non-pleated vacuum bag.

Also, although the above description describes a gantry that is used to control a vacuum bagging machine, it is conceivable that an arrangement other than a gantry be used to control a vacuum bagging machine.

Figure 14:
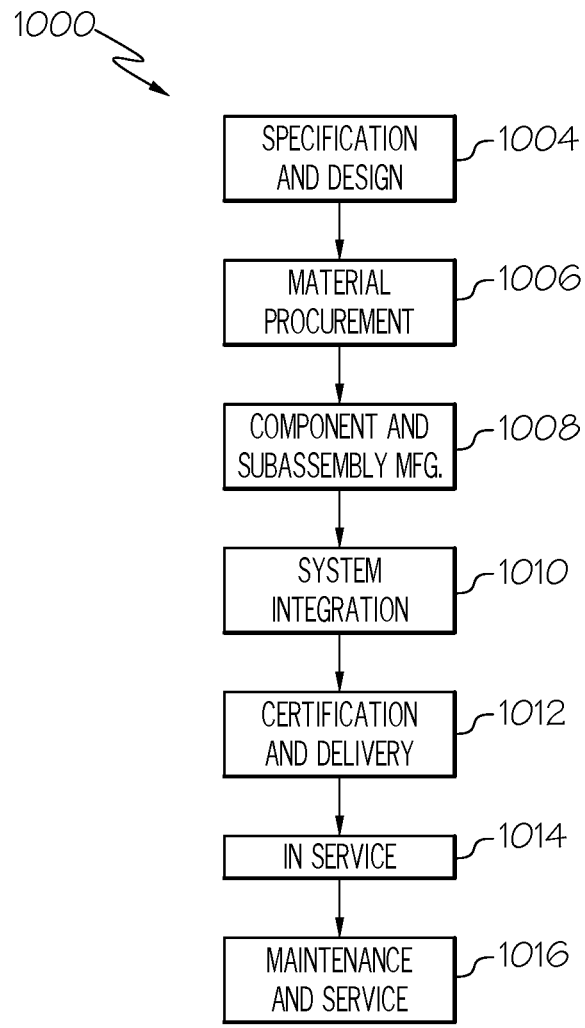
FIG. 14 is a flow diagram of an aircraft manufacturing and service methodology.
Figure 15:
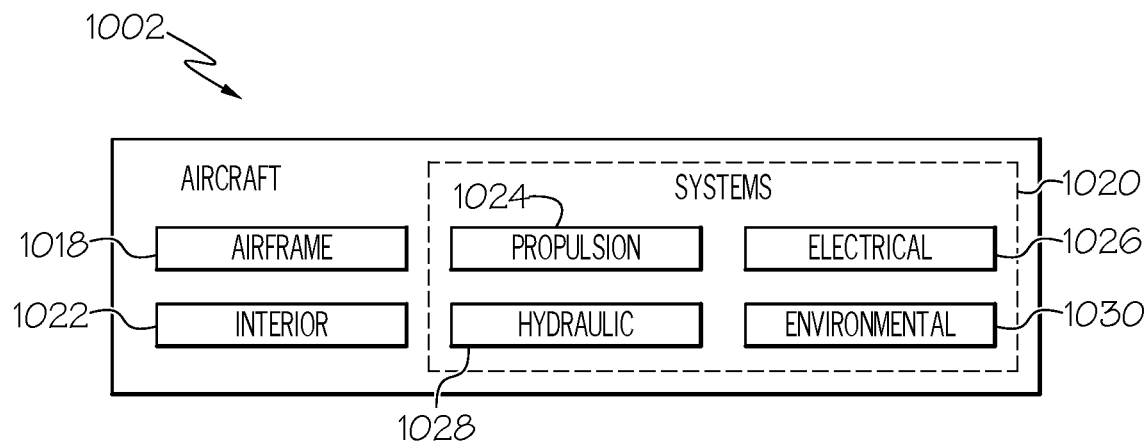
FIG. 15 is a block diagram of an aircraft.

Examples of the disclosure may be described in the context of an aircraft manufacturing and service method 1000, as shown in FIG. 14, and an aircraft 1002, as shown in FIG. 15. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed apparatus and method may be employed during any one or more of the stages of the aircraft manufacturing and service method 1000. As one example, components or subassemblies corresponding to component/subassembly manufacturing 1008, system integration 1010 and/or maintenance and service 1016 may be assembled using the disclosed apparatus method. As another example, the airframe 1018 may be constructed using the disclosed apparatus and method. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, helicopters, passenger ships, automobiles, marine products (boat, motors, etc.) and the like. Non-vehicle applications are also contemplated.

Also, although the above-description describes an apparatus and method for forming and positioning pleats over stringers for an airplane part in the aviation industry in accordance with military and space regulations, it is contemplated that the apparatus and method may be implemented to facilitate forming and positioning pleats over stringers in any industry in accordance with the applicable industry standards. The specific apparatus and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A method for automatically operating a vacuum bagging machine to form a pleat of a vacuum bag into position over an uncured skin panel including a stringer, the method comprising:
   forming a pleat of the vacuum bag; and
   roller compacting the vacuum bag including the formed pleat over the uncured skin panel including the stringer.

2. The method of claim 1, wherein the roller compacting the vacuum bag including the formed pleat into position over the uncured skin panel including the stringer includes:
   roller compacting a horizontal portion of the vacuum bag in a first direction against a horizontal surface portion of the uncured skin panel.

3. The method of claim 2, wherein the roller compacting the vacuum bag including the formed pleat into position over the uncured skin panel including the stringer includes:
   roller compacting a vertical pleat portion of the formed pleat in a second direction against a vertical surface portion of the stringer, wherein the second direction extends transverse to the first direction.

4. The method of claim 3, wherein the roller compacting the vacuum bag including the formed pleat into position over the uncured skin panel including the stringer includes:
   roller compacting a radius portion of the formed pleat in a third direction against a region, wherein the third direction extends between the first and second directions and the region interconnects the vertical surface portion of the stringer and the horizontal surface portion of the uncured skin panel.

5. The method of claim 1, wherein the method is performed by a computer having a memory executing one or more programs of instructions which are tangibly embodied in a program storage medium readable by the computer.

6. The method of claim 1, further comprising passing the vacuum bag between a leading shoe and a trailing shoe, the leading shoe comprising a wedge portion having an inclined surface and a finger that extends away from the inclined surface of the wedge portion, the inclined surface of the wedge portion comprising a plurality of openings.

7. The method of claim 6, further comprising guiding the vacuum bag along the inclined surface of the wedge portion towards the finger.

8. The method of claim 7, further comprising supplying air through the plurality of openings such that the air engages the vacuum bag during the guiding the vacuum bag along the inclined surface.

9. The method of claim 7, further comprising forming the pleat on the finger.

10. The method of claim 6, wherein the trailing shoe includes a pair of wedge members, each wedge member of the pair of wedge members comprises an inclined surface, wherein the inclined surface of each wedge member comprises a plurality of openings.

11. The method of claim 10, further comprising supplying air through the plurality of openings of the inclined surface of each wedge member such that the air engages the vacuum bag.

12. A method for automatically operating a vacuum bagging machine to form a pleat of a vacuum bag into position over an uncured skin panel including a stringer, the method comprising:
   roller compacting a first portion of the vacuum bag in a first direction against a surface of the uncured skin panel; and
   roller compacting a second portion of the vacuum bag in a second direction against a surface of the stringer, wherein the second direction extends transverse to the first direction.

13. The method of claim 12, further comprising:
   roller compacting a third portion of the vacuum bag in a third direction against an arcuate surface that interconnects the surface of the uncured skin panel and the surface of stringer, wherein the third direction extends between the first and second directions.

14. The method of claim 12, further comprising:
prior to the first and second portions of the vacuum bag being roller-compacted, forming the first portion into position over the uncured skin panel and forming the second portion into position over the stringer.

15. The method of claim 12, wherein the method is performed by a computer having a memory executing one or more programs of instructions which are tangibly embodied in a program storage medium readable by the computer.

16. The method of claim 12, further comprising passing the vacuum bag between a leading shoe and a trailing shoe of the vacuum bagging machine, the leading shoe comprising a wedge portion having an inclined surface and a finger that extends away from the inclined surface of the wedge portion, the inclined surface of the wedge portion comprising a plurality of openings.

17. The method of claim 16, further comprising guiding the vacuum bag along the inclined surface of the wedge portion towards the finger.

18. The method of claim 17, further comprising supplying air through the plurality of openings such that the air engages the vacuum bag during the guiding the vacuum bag along the inclined surface.

19. The method of claim 17, further comprising forming the pleat on the finger.

20. The method of claim 16, wherein the trailing shoe includes a pair of wedge members, each wedge member of the pair of wedge members comprises an inclined surface, wherein the inclined surface of each wedge member comprises a plurality of openings.

21. The method of claim 20, further comprising supplying air through the plurality of openings of the inclined surface of each wedge member such that the air engages the vacuum bag.

* * * * *